United States Patent
Kasada

(10) Patent No.: US 10,366,721 B2
(45) Date of Patent: Jul. 30, 2019

(54) HEAD POSITIONING OF TIMING-BASED SERVO SYSTEM FOR MAGNETIC TAPE RECORDING DEVICE

(71) Applicant: FUJIFILM Corporation, Tokyo (JP)

(72) Inventor: Norihito Kasada, Minami-ashigara (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 16/009,603

(22) Filed: Jun. 15, 2018

(65) Prior Publication Data

US 2018/0374507 A1      Dec. 27, 2018

(30) Foreign Application Priority Data

Jun. 23, 2017    (JP) .................................. 2017-123039

(51) Int. Cl.
*G11B 5/706* (2006.01)
*G11B 20/12* (2006.01)
(Continued)

(52) U.S. Cl.
CPC ...... *G11B 5/70615* (2013.01); *G11B 5/00813* (2013.01); *G11B 5/00817* (2013.01); *G11B 5/584* (2013.01); *G11B 5/70* (2013.01); *G11B 5/70678* (2013.01); *G11B 20/1201* (2013.01); *G11B 5/3906* (2013.01);
(Continued)

(58) Field of Classification Search
None
See application file for complete search history.

(56) References Cited

U.S. PATENT DOCUMENTS

| 3,966,686 A | 6/1976 | Asakura et al. |
| 4,112,187 A | 9/1978 | Asakura et al. |

(Continued)

FOREIGN PATENT DOCUMENTS

| DE | 101 46 429 A1 | 3/2002 |
| GB | 2495356 A | 4/2013 |

(Continued)

OTHER PUBLICATIONS

Notice of Allowance dated Aug. 6, 2018 in U.S. Appl. No. 15/920,768.
(Continued)

*Primary Examiner* — Tan X Dinh
(74) *Attorney, Agent, or Firm* — Sughrue Mion, PLLC

(57) ABSTRACT

The magnetic tape includes a non-magnetic support; and a magnetic layer including ferromagnetic powder and a binding agent on the non-magnetic support, in which the magnetic layer includes a timing-based servo pattern, the ferromagnetic powder is ferromagnetic hexagonal ferrite powder having an activation volume equal to or smaller than 1,600 $nm^3$, an XRD intensity ratio Int(110)/Int(114) obtained by an X-ray diffraction analysis of the magnetic layer by using an In-Plane method is 0.5 to 4.0, a vertical direction squareness ratio of the magnetic tape is 0.65 to 1.00, and an edge shape of the timing-based servo pattern specified by magnetic force microscope observation is a shape in which a difference ($L_{99.9} - L_{0.1}$) is equal to or smaller than 180 nm, and a magnetic tape device including the magnetic tape.

14 Claims, 4 Drawing Sheets

(51) Int. Cl.
  *G11B 5/008* (2006.01)
  *G11B 5/70* (2006.01)
  *G11B 5/584* (2006.01)
  *G11B 5/712* (2006.01)
  *G11B 5/39* (2006.01)
  *G11B 5/592* (2006.01)

(52) U.S. Cl.
  CPC .......... *G11B 5/3909* (2013.01); *G11B 5/5926* (2013.01); *G11B 5/712* (2013.01)

(56) References Cited

U.S. PATENT DOCUMENTS

| | | | |
|---|---|---|---|
| 4,425,404 A | 1/1984 | Suzuki et al. | |
| 4,693,930 A | 9/1987 | Kuo et al. | |
| 4,746,569 A | 5/1988 | Takahashi et al. | |
| 4,825,317 A | 4/1989 | Rausch | |
| 5,242,752 A | 9/1993 | Isobe et al. | |
| 5,419,938 A | 5/1995 | Kahotani et al. | |
| 5,445,881 A | 8/1995 | Irie | |
| 5,474,814 A | 12/1995 | Komatsu et al. | |
| 5,496,607 A | 3/1996 | Inaba et al. | |
| 5,540,957 A | 7/1996 | Ueda et al. | |
| 5,585,032 A | 12/1996 | Nakata et al. | |
| 5,645,917 A | 7/1997 | Ejiri et al. | |
| 5,689,384 A | 11/1997 | Albrecht et al. | |
| 5,728,454 A | 3/1998 | Inaba et al. | |
| 5,786,074 A | 6/1998 | Soui | |
| 6,099,957 A | 8/2000 | Yamamoto et al. | |
| 6,183,606 B1 | 2/2001 | Kuo et al. | |
| 6,207,252 B1 | 3/2001 | Shimomura | |
| 6,228,461 B1 | 5/2001 | Sueki et al. | |
| 6,254,964 B1 | 7/2001 | Saito et al. | |
| 6,261,647 B1 | 7/2001 | Komatsu et al. | |
| 6,268,043 B1 | 7/2001 | Koizumi et al. | |
| 6,496,328 B1 | 12/2002 | Dugas | |
| 6,579,826 B2 | 6/2003 | Furuya et al. | |
| 6,649,256 B1 | 11/2003 | Buczek et al. | |
| 6,686,022 B2 | 2/2004 | Takano et al. | |
| 6,770,359 B2 | 8/2004 | Masaki | |
| 6,791,803 B2 | 9/2004 | Saito et al. | |
| 6,835,461 B1 | 12/2004 | Yamagata et al. | |
| 6,921,592 B2 | 7/2005 | Tani et al. | |
| 6,939,606 B2 | 9/2005 | Hashimoto et al. | |
| 6,950,269 B1 | 9/2005 | Johnson | |
| 7,014,927 B2 | 3/2006 | Sueki et al. | |
| 7,029,726 B1* | 4/2006 | Chen ...................... | G11B 5/584 427/129 |
| 7,153,366 B1* | 12/2006 | Chen ...................... | G11B 5/584 118/620 |
| 7,255,908 B2 | 8/2007 | Ishikawa et al. | |
| 7,511,907 B2 | 3/2009 | Dugas et al. | |
| 7,515,383 B2 | 4/2009 | Saito et al. | |
| 7,803,471 B1 | 9/2010 | Ota et al. | |
| 7,839,599 B2 | 11/2010 | Bui et al. | |
| 8,000,057 B2 | 8/2011 | Bui et al. | |
| 8,524,108 B2 | 9/2013 | Hattori | |
| 8,535,817 B2 | 9/2013 | Imaoka | |
| 8,576,510 B2 | 11/2013 | Cherubini et al. | |
| 8,681,451 B2 | 3/2014 | Harasawa et al. | |
| 9,105,294 B2 | 8/2015 | Jensen et al. | |
| 9,311,946 B2 | 4/2016 | Tanaka et al. | |
| 9,495,985 B2 | 11/2016 | Biskeborn et al. | |
| 9,530,444 B2 | 12/2016 | Kasada | |
| 9,542,967 B2 | 1/2017 | Sekiguchi et al. | |
| 9,564,161 B1 | 2/2017 | Cherubini et al. | |
| 9,601,146 B2 | 3/2017 | Kasada et al. | |
| 9,704,425 B2 | 7/2017 | Zhang et al. | |
| 9,704,525 B2 | 7/2017 | Kasada | |
| 9,704,527 B2 | 7/2017 | Kasada | |
| 9,711,174 B2 | 7/2017 | Kasada et al. | |
| 9,721,605 B2 | 8/2017 | Oyanagi et al. | |
| 9,721,606 B2 | 8/2017 | Kasada | |
| 9,721,607 B2 | 8/2017 | Tada et al. | |
| 9,748,026 B2 | 8/2017 | Shirata | |
| 9,773,519 B2 | 9/2017 | Kasada et al. | |
| 9,779,772 B1 | 10/2017 | Kasada et al. | |
| 9,837,116 B2 | 12/2017 | Ozawa et al. | |
| 9,959,894 B2 | 5/2018 | Omura | |
| 9,972,351 B1 | 5/2018 | Kaneko et al. | |
| 9,978,414 B1 | 5/2018 | Kaneko et al. | |
| 9,984,710 B2 | 5/2018 | Kasada | |
| 9,984,712 B1 | 5/2018 | Ozawa | |
| 9,984,716 B1 | 5/2018 | Kaneko et al. | |
| 10,008,230 B1 | 6/2018 | Ozawa et al. | |
| 10,026,430 B2 | 7/2018 | Kasada et al. | |
| 10,026,433 B2 | 7/2018 | Kasada et al. | |
| 10,026,434 B2 | 7/2018 | Oyanagi et al. | |
| 10,026,435 B2 | 7/2018 | Kasada et al. | |
| 10,062,403 B1 | 8/2018 | Kasada et al. | |
| 10,074,393 B2* | 9/2018 | Kaneko ............... | G11B 5/70615 |
| 10,134,433 B2 | 11/2018 | Kasada et al. | |
| 2001/0038928 A1 | 11/2001 | Nakamigawa et al. | |
| 2001/0053458 A1 | 12/2001 | Suzuki et al. | |
| 2002/0072472 A1 | 7/2002 | Furuya et al. | |
| 2002/0122339 A1 | 9/2002 | Takano et al. | |
| 2003/0059649 A1 | 3/2003 | Saliba et al. | |
| 2003/0091866 A1* | 5/2003 | Ejiri ..................... | G11B 5/70 428/818 |
| 2003/0124386 A1 | 7/2003 | Masaki | |
| 2003/0170498 A1 | 9/2003 | Inoue | |
| 2004/0018388 A1 | 1/2004 | Kitamura et al. | |
| 2004/0053074 A1 | 3/2004 | Jingu et al. | |
| 2004/0197605 A1 | 10/2004 | Seki et al. | |
| 2004/0213948 A1 | 10/2004 | Saito et al. | |
| 2004/0218304 A1 | 11/2004 | Goker et al. | |
| 2005/0057838 A1 | 3/2005 | Ohtsu | |
| 2005/0153170 A1 | 7/2005 | Inoue et al. | |
| 2005/0196645 A1 | 9/2005 | Doi et al. | |
| 2005/0260456 A1 | 11/2005 | Hanai et al. | |
| 2005/0260459 A1 | 11/2005 | Hanai et al. | |
| 2005/0264935 A1 | 12/2005 | Sueki et al. | |
| 2006/0008681 A1 | 1/2006 | Hashimoto et al. | |
| 2006/0035114 A1 | 2/2006 | Kuse et al. | |
| 2006/0056095 A1 | 3/2006 | Saitou | |
| 2006/0068232 A1 | 3/2006 | Mikamo et al. | |
| 2006/0232883 A1 | 10/2006 | Biskeborn et al. | |
| 2007/0020490 A1 | 1/2007 | Harasawa et al. | |
| 2007/0224456 A1 | 9/2007 | Murao et al. | |
| 2007/0230054 A1 | 10/2007 | Takeda et al. | |
| 2007/0231606 A1 | 10/2007 | Hanai | |
| 2008/0144211 A1 | 6/2008 | Weber et al. | |
| 2008/0152956 A1 | 6/2008 | Murayama et al. | |
| 2008/0174897 A1 | 7/2008 | Bates et al. | |
| 2008/0297950 A1 | 12/2008 | Noguchi et al. | |
| 2008/0311308 A1 | 12/2008 | Lee et al. | |
| 2009/0027812 A1 | 1/2009 | Noguchi et al. | |
| 2009/0087689 A1 | 4/2009 | Doushita et al. | |
| 2009/0161249 A1 | 6/2009 | Takayama et al. | |
| 2009/0162701 A1 | 6/2009 | Jensen et al. | |
| 2010/0000966 A1 | 1/2010 | Kamata et al. | |
| 2010/0035086 A1 | 2/2010 | Inoue et al. | |
| 2010/0035088 A1 | 2/2010 | Inoue | |
| 2010/0053810 A1 | 3/2010 | Biskeborn et al. | |
| 2010/0081011 A1 | 4/2010 | Nakamura | |
| 2010/0134929 A1 | 6/2010 | Ito | |
| 2010/0227201 A1 | 9/2010 | Sasaki et al. | |
| 2010/0246073 A1 | 9/2010 | Katayama | |
| 2011/0003241 A1 | 1/2011 | Kaneko et al. | |
| 2011/0051280 A1 | 3/2011 | Karp et al. | |
| 2011/0052908 A1 | 3/2011 | Imaoka | |
| 2011/0077902 A1 | 3/2011 | Awezec et al. | |
| 2011/0151281 A1 | 6/2011 | Inoue | |
| 2011/0244272 A1 | 10/2011 | Suzuki et al. | |
| 2012/0045664 A1 | 2/2012 | Tanaka et al. | |
| 2012/0177951 A1 | 7/2012 | Yamazaki et al. | |
| 2012/0183811 A1 | 7/2012 | Hattori et al. | |
| 2012/0196156 A1 | 8/2012 | Suzuki | |
| 2012/0243120 A1 | 9/2012 | Harasawa et al. | |
| 2012/0244387 A1 | 9/2012 | Mori et al. | |
| 2012/0251845 A1 | 10/2012 | Wang et al. | |
| 2013/0029183 A1 | 1/2013 | Omura | |
| 2013/0084470 A1 | 4/2013 | Hattori et al. | |
| 2013/0088794 A1 | 4/2013 | Cherubini et al. | |

(56) References Cited

U.S. PATENT DOCUMENTS

| | | | |
|---|---|---|---|
| 2013/0256584 A1 | 10/2013 | Yamazaki et al. |
| 2013/0260179 A1 | 10/2013 | Kasada et al. |
| 2013/0279040 A1 | 10/2013 | Cideciyan et al. |
| 2013/0286510 A1 | 10/2013 | Rothermel et al. |
| 2014/0011055 A1 | 1/2014 | Suzuki et al. |
| 2014/0130067 A1 | 5/2014 | Madison et al. |
| 2014/0139944 A1 | 5/2014 | Johnson et al. |
| 2014/0272474 A1 | 9/2014 | Kasada |
| 2014/0295214 A1 | 10/2014 | Tada et al. |
| 2014/0342189 A1 | 11/2014 | Tachibana et al. |
| 2014/0366990 A1 | 12/2014 | Lai et al. |
| 2015/0043101 A1 | 2/2015 | Biskeborn et al. |
| 2015/0098149 A1 | 4/2015 | Bates et al. |
| 2015/0111066 A1 | 4/2015 | Terakawa et al. |
| 2015/0123026 A1 | 5/2015 | Masada et al. |
| 2015/0380036 A1 | 12/2015 | Kasada et al. |
| 2016/0061447 A1 | 3/2016 | Kobayashi |
| 2016/0064025 A1 | 3/2016 | Kurokawa et al. |
| 2016/0092315 A1 | 3/2016 | Ashida et al. |
| 2016/0093321 A1 | 3/2016 | Aoshima et al. |
| 2016/0093322 A1 | 3/2016 | Kasada et al. |
| 2016/0093323 A1 | 3/2016 | Omura |
| 2016/0180875 A1 | 6/2016 | Tanaka et al. |
| 2016/0189739 A1 | 6/2016 | Kasada et al. |
| 2016/0189740 A1 | 6/2016 | Oyanagi et al. |
| 2016/0247530 A1 | 8/2016 | Kasada |
| 2016/0260449 A1 | 9/2016 | Ahmad et al. |
| 2016/0276076 A1 | 9/2016 | Kasada |
| 2017/0032812 A1 | 2/2017 | Kasada |
| 2017/0053669 A1 | 2/2017 | Kasada |
| 2017/0053670 A1 | 2/2017 | Oyanagi et al. |
| 2017/0053671 A1 | 2/2017 | Kasada et al. |
| 2017/0058227 A1 | 3/2017 | Kondo et al. |
| 2017/0092315 A1 | 3/2017 | Ozawa et al. |
| 2017/0130156 A1 | 5/2017 | Kondo et al. |
| 2017/0178675 A1 | 6/2017 | Kasada |
| 2017/0178676 A1 | 6/2017 | Kasada |
| 2017/0178677 A1 | 6/2017 | Kasada |
| 2017/0186456 A1 | 6/2017 | Tada et al. |
| 2017/0186460 A1 | 6/2017 | Kasada et al. |
| 2017/0221516 A1 | 8/2017 | Oyanagi et al. |
| 2017/0221517 A1 | 8/2017 | Ozawa et al. |
| 2017/0249963 A1 | 8/2017 | Oyanagi et al. |
| 2017/0249964 A1 | 8/2017 | Kasada et al. |
| 2017/0249965 A1 | 8/2017 | Kurokawa et al. |
| 2017/0249966 A1 | 8/2017 | Tachibana et al. |
| 2017/0287517 A1 | 10/2017 | Hosoya et al. |
| 2017/0355022 A1 | 12/2017 | Kaneko et al. |
| 2017/0358318 A1 | 12/2017 | Kasada et al. |
| 2017/0372726 A1 | 12/2017 | Kasada et al. |
| 2017/0372727 A1 | 12/2017 | Kasada et al. |
| 2017/0372736 A1 | 12/2017 | Kaneko et al. |
| 2017/0372737 A1 | 12/2017 | Oyanagi et al. |
| 2017/0372738 A1 | 12/2017 | Kasada |
| 2017/0372739 A1 | 12/2017 | Ozawa et al. |
| 2017/0372740 A1 | 12/2017 | Ozawa et al. |
| 2017/0372741 A1 | 12/2017 | Kurokawa et al. |
| 2017/0372742 A1 | 12/2017 | Kaneko et al. |
| 2017/0372743 A1 | 12/2017 | Kasada et al. |
| 2017/0372744 A1 | 12/2017 | Ozawa et al. |
| 2018/0061446 A1 | 3/2018 | Kasada |
| 2018/0061447 A1 | 3/2018 | Kasada |
| 2018/0082710 A1 | 3/2018 | Tada et al. |
| 2018/0137887 A1 | 5/2018 | Sekiguchi et al. |
| 2018/0182417 A1 | 6/2018 | Kaneko et al. |
| 2018/0182422 A1 | 6/2018 | Kawakami et al. |
| 2018/0182425 A1 | 6/2018 | Kasada et al. |
| 2018/0182426 A1 | 6/2018 | Ozawa et al. |
| 2018/0182427 A1 | 6/2018 | Kasada et al. |
| 2018/0182428 A1 | 6/2018 | Kasada et al. |
| 2018/0182429 A1 | 6/2018 | Kasada et al. |
| 2018/0182430 A1 | 6/2018 | Ozawa et al. |
| 2018/0240475 A1 | 8/2018 | Kasada |
| 2018/0240476 A1 | 8/2018 | Kasada et al. |
| 2018/0240478 A1* | 8/2018 | Kasada .................. G11B 5/70 |
| 2018/0240479 A1 | 8/2018 | Kasada et al. |
| 2018/0240481 A1* | 8/2018 | Kasada .................. G11B 5/584 |
| 2018/0240488 A1 | 8/2018 | Kasada |
| 2018/0240489 A1 | 8/2018 | Kasada et al. |
| 2018/0240490 A1 | 8/2018 | Kurokawa et al. |
| 2018/0240491 A1 | 8/2018 | Ozawa et al. |
| 2018/0240492 A1 | 8/2018 | Kasada |
| 2018/0240493 A1 | 8/2018 | Tada et al. |
| 2018/0240494 A1 | 8/2018 | Kurokawa et al. |
| 2018/0240495 A1 | 8/2018 | Kasada |
| 2018/0286439 A1 | 10/2018 | Ozawa et al. |
| 2018/0286442 A1* | 10/2018 | Ozawa .............. G11B 5/70615 |
| 2018/0286443 A1 | 10/2018 | Ozawa et al. |
| 2018/0286444 A1 | 10/2018 | Kasada et al. |
| 2018/0286446 A1* | 10/2018 | Ozawa .................. G11B 5/712 |
| 2018/0286447 A1* | 10/2018 | Ozawa .................. G11B 5/712 |
| 2018/0286448 A1 | 10/2018 | Ozawa et al. |
| 2018/0286449 A1* | 10/2018 | Kasada .................. G11B 5/714 |
| 2018/0286450 A1* | 10/2018 | Kasada ..................... G11B 5/70 |
| 2018/0286451 A1 | 10/2018 | Ozawa et al. |
| 2018/0286452 A1 | 10/2018 | Ozawa et al. |
| 2018/0286453 A1 | 10/2018 | Kasada et al. |
| 2018/0301165 A1 | 10/2018 | Oyanagi et al. |
| 2018/0350398 A1 | 12/2018 | Kawakami et al. |
| 2018/0350400 A1 | 12/2018 | Kaneko et al. |
| 2019/0027167 A1 | 1/2019 | Tada et al. |
| 2019/0027168 A1 | 1/2019 | Kasada et al. |
| 2019/0027171 A1 | 1/2019 | Kasada |
| 2019/0027172 A1 | 1/2019 | Kasada |
| 2019/0027174 A1 | 1/2019 | Tada et al. |
| 2019/0027175 A1* | 1/2019 | Kurokawa ............. G11B 5/702 |
| 2019/0027176 A1 | 1/2019 | Kurokawa et al. |
| 2019/0027177 A1 | 1/2019 | Kasada |
| 2019/0027178 A1 | 1/2019 | Kasada |
| 2019/0027179 A1 | 1/2019 | Ozawa et al. |
| 2019/0027180 A1 | 1/2019 | Kasada et al. |
| 2019/0027181 A1 | 1/2019 | Ozawa et al. |
| 2019/0035424 A1 | 1/2019 | Endo |
| 2019/0051325 A1 | 2/2019 | Kasada et al. |
| 2019/0088278 A1 | 3/2019 | Kasada et al. |
| 2019/0096437 A1 | 3/2019 | Ozawa et al. |
| 2019/0103130 A1 | 4/2019 | Kasada et al. |
| 2019/0103131 A1 | 4/2019 | Kasada et al. |
| 2019/0103133 A1 | 4/2019 | Ozawa et al. |
| 2019/0103134 A1 | 4/2019 | Kasada et al. |
| 2019/0103135 A1 | 4/2019 | Ozawa et al. |
| 2019/0130936 A1 | 5/2019 | Kaneko et al. |

FOREIGN PATENT DOCUMENTS

| | | |
|---|---|---|
| JP | 61-11924 A | 1/1986 |
| JP | 61-139923 A | 6/1986 |
| JP | 61-139932 A | 6/1986 |
| JP | 63-129519 A | 6/1988 |
| JP | 63-249932 A | 10/1988 |
| JP | 64-57422 A | 3/1989 |
| JP | 64-60819 A | 3/1989 |
| JP | 5-258283 A | 10/1993 |
| JP | 5-298653 A | 11/1993 |
| JP | 7-57242 A | 3/1995 |
| JP | 11-110743 A | 4/1999 |
| JP | 11-175949 A | 7/1999 |
| JP | 11-273051 A | 10/1999 |
| JP | 2000-251240 A | 9/2000 |
| JP | 2002-157726 A | 5/2002 |
| JP | 2002-329605 A | 11/2002 |
| JP | 2002-367142 A | 12/2002 |
| JP | 2002-367318 A | 12/2002 |
| JP | 2003-77116 A | 3/2003 |
| JP | 2003-323710 A | 11/2003 |
| JP | 2004-005820 A | 1/2004 |
| JP | 2004-133997 A | 4/2004 |
| JP | 2004-185676 A | 7/2004 |
| JP | 2005-38579 A | 2/2005 |
| JP | 2005-243063 A | 9/2005 |
| JP | 2005-243162 A | 9/2005 |
| JP | 2006-92672 A | 4/2006 |
| JP | 2006-286114 A | 10/2006 |
| JP | 2007-273039 A | 10/2007 |

(56) References Cited

FOREIGN PATENT DOCUMENTS

| | | |
|---|---|---|
| JP | 2007-287310 A | 11/2007 |
| JP | 2007-297427 A | 11/2007 |
| JP | 2008-243317 A | 10/2008 |
| JP | 2009-283082 A | 12/2009 |
| JP | 2010-49731 A | 3/2010 |
| JP | 2011-48878 A | 3/2011 |
| JP | 2011-210288 A | 10/2011 |
| JP | 2011-225417 A | 11/2011 |
| JP | 2012-38367 A | 2/2012 |
| JP | 2012-043495 A | 3/2012 |
| JP | 2012-203955 A | 10/2012 |
| JP | 2013-77360 A | 4/2013 |
| JP | 2014-015453 A | 1/2014 |
| JP | 2014-179149 A | 9/2014 |
| JP | 2015-39801 A | 3/2015 |
| JP | 2015-111484 A | 6/2015 |
| JP | 2016-15183 A | 1/2016 |
| JP | 2016-051493 A | 4/2016 |

OTHER PUBLICATIONS

Office Action dated Nov. 28, 2018, issued by the USPTO in U.S. Appl. No. 15/899,587.
Notice of Allowance dated Dec. 3, 2018 in U.S. Appl. No. 15/920,518.
Office Action dated Jul. 3, 2018, issued by the USPTO in U.S. Appl. No. 15/920,518.
U.S. Appl. No. 15/920,518, Allowed.
U.S. Appl. No. 15/920,768, Allowed; RCE filed.
U.S. Appl. No. 16/009,603 (the present Application), Quayle Action issued (RCE filed).
U.S. Appl. No. 16/182,083, Pending (Not yet published; continuation of U.S. Appl. No. 15/920,768).
U.S. Appl. No. 16/232,165, Pending (Continuation of U.S. Appl. No. 15/854,438).
U.S. Appl. No. 16/100,289, Pending.
Notice of Allowance dated Jan. 30, 2019 in U.S. Appl. No. 15/854,409.
Office Action dated Dec. 20, 2018 in U.S. Appl. No. 15/900,106.
Office Action dated Jan. 29, 2019 in U.S. Appl. No. 15/614,876.
Office Action dated Jan. 30, 2019 in U.S. Appl. No. 15/620,916.
Office Action dated Apr. 26, 2017 which issued during the prosecution of U.S. Appl. No. 15/388,864.
Office Action dated Aug. 10, 2017, which issued during the prosecution of U.S. Appl. No. 14/870,618.
Office Action dated Aug. 3, 2018 which issued during the prosecution of U.S. Appl. No. 15/388,911.
Office Action dated Feb. 4, 2016 which issued during the prosecution of U.S. Appl. No. 14/753,227.
Office Action dated Jul. 6, 2018, which issued during the prosecution of U.S. Appl. No. 15/848,173.
Office Action dated Jun. 7, 2018 which issued during the prosecution of U.S. Appl. No. 15/380,309.
Office Action dated May 2, 2018, which issued during the prosecution of U.S. Appl. No. 15/280,195.
Office Action dated May 4, 2018, which issued during the prosecution of U.S. Appl. No. 15/422,821.
Office Action dated May 4, 2018, which issued during the prosecution of U.S. Appl. No. 15/625,428.
Office Action dated May 7, 2018, which issued during the prosecution of U.S. Appl. No. 15/624,792.
Office Action dated May 7, 2018, which issued during the prosecution of U.S. Appl. No. 15/624,897.
Office Action dated May 7, 2018, which issued during the prosecution of U.S. Appl. No. 15/626,832.
Office Action dated Nov. 16, 2016 which issued during the prosecution of U.S. Appl. No. 15/072,550.
Office Action dated Oct. 12, 2018, which issued during the prosecution of U.S. Appl. No. 15/626,355.
Office Action dated Oct. 12, 2018, which issued during the prosecution of U.S. Appl. No. 15/627,696.
Office Action dated Oct. 15, 2018, which issued during the prosecution of U.S. Appl. No. 15/619,012.
Office Action dated Oct. 22, 2018, which issued during the prosecution of U.S. Appl. No. 15/854,439.
Office Action dated Oct. 9, 2018, which issued during the prosecution of U.S. Appl. No. 15/628,814.
Office Action dated Sep. 24, 2018, which issued during the prosecution of U.S. Appl. No. 15/690,400.
Office Action dated Sep. 27, 2018, which issued during the prosecution of U.S. Appl. No. 15/690,906.
Office Action dated Sep. 27, 2018, which issued during the prosecution of U.S. Appl. No. 15/854,383.
Communication dated Aug. 23, 2018 from the United States Patent and Trademark Office in U.S. Appl. No. 15/614,876.
Communication dated Aug. 23, 2018 from the United States Patent and Trademark Office in U.S. Appl. No. 15/621,464.
Communication dated Aug. 23, 2018 from the United States Patent and Trademark Office in U.S. Appl. No. 15/626,720.
Communication dated Aug. 24, 2018 from the United States Patent and Trademark Office in U.S. Appl. No. 15/620,916.
Communication dated Aug. 3, 2018 from the United States Patent and Trademark Office in U.S. Appl. No. 15/380,336.
Communication dated Dec. 5, 2016 from the United States Patent and Trademark Office in U.S. Appl. No. 14/978,834.
Communication dated Dec. 6, 2016 from the United States Patent and Trademark Office in U.S. Appl. No. 14/757,555.
Communication dated Jun. 9, 2017 which issued during the prosecution of U.S. Appl. No. 15/388,864.
Communication dated May 30, 2018 which issued during the prosecution of U.S. Appl. No. 15/388,911.
Communication dated Nov. 18, 2016 which issued during the prosecution of U.S. Appl. No. 14/753,227.
Final Office Action dated Aug. 15, 2016 which issued during the prosecution of U.S. Appl. No. 14/753,227.
Notice of Allowance dated Apr. 25, 2017 which issued during the prosecution of U.S. Appl. No. 15/072,550.
Notice of Allowance dated Apr. 27, 2017, which issued during the prosecution of U.S. Appl. No. 15/052,115.
Notice of Allowance dated Apr. 5, 2018, which issued during the prosecution of U.S. Appl. No. 14/867,752.
Notice of Allowance dated Aug. 28, 2018, which issued during the prosecution of U.S. Appl. No. 15/422,821.
Notice of Allowance dated Aug. 30, 2017, which issued during the prosecution of U.S. Appl. No. 15/466,143.
Notice of Allowance dated Aug. 9, 2018, which issued during the prosecution of U.S. Appl. No. 15/920,563.
Notice of Allowance dated Dec. 2, 2016 which issued during the prosecution of U.S. Appl. No. 14/753,227.
Notice of Allowance dated Dec. 4, 2018, which issued during the prosecution of U.S. Appl. No. 15/625,428.
Notice of Allowance dated Feb. 14, 2018, which issued during the prosecution of U.S. Appl. No. 14/870,618.
Notice of Allowance dated Jul. 12, 2017 which issued during the prosecution of U.S. Appl. No. 15/388,864.
Notice of Allowance dated Jul. 13, 2018, which issued during the prosecution of U.S. Appl. No. 15/920,782.
Notice of Allowance dated Jun. 2, 2017, which issued during the prosecution of U.S. Appl. No. 15/218,190.
Notice of Allowance dated Jun. 28, 2017, which issued during the prosecution of U.S. Appl. No. 15/464,991.
Notice of Allowance dated Mar. 14, 2018, which issued during the prosecution of U.S. Appl. No. 15/854,474.
Notice of Allowance dated Mar. 16, 2018 which issued during the prosecution of U.S. Appl. No. 15/854,410.
Notice of Allowance dated Mar. 19, 2018, which issued during the prosecution of U.S. Appl. No. 15/378,907.
Notice of Allowance dated Mar. 21, 2018, which issued during the prosecution of U.S. Appl. No. 15/241,286.
Notice of Allowance dated Mar. 21, 2018, which issued during the prosecution of U.S. Appl. No. 15/241,297.
Notice of Allowance dated Mar. 27, 2018, which issued during the prosecution of U.S. Appl. No. 15/241,631.

(56) References Cited

OTHER PUBLICATIONS

Notice of Allowance dated May 10, 2018 which issued during the prosecution of U.S. Appl. No. 15/615,871.
Notice of Allowance dated May 8, 2017, which issued during the prosecution of U.S. Appl. No. 14/757,555.
Notice of Allowance dated May 8, 2017, which issued during the prosecution of U.S. Appl. No. 14/978,834.
Notice of Allowance dated Oct. 11, 2018, which issued during the prosecution of U.S. Appl. No. 15/380,336.
Notice of Allowance dated Oct. 11, 2018, which issued during the prosecution of U.S. Appl. No. 15/624,792.
Notice of Allowance dated Oct. 11, 2018, which issued during the prosecution of U.S. Appl. No. 15/624,897.
Notice of Allowance dated Oct. 12, 2018, which issued during the prosecution of U.S. Appl. No. 15/626,832.
Notice of Allowance dated Oct. 6, 2016, which issued during the prosecution of U.S. Appl. No. 14/209,065.
Notice of Allowance dated Sep. 24, 2018, which issued during the prosecution of U.S. Appl. No. 15/854,438.
Notice of Allowance dated Sep. 4, 2018, which issued during the prosecution of U.S. Appl. No. 15/625,428.
Notice of Allowance dated Jan. 10, 2019 in U.S. Appl. No. 15/848,173.
Notice of Allowance dated Jan. 17, 2019 in U.S. Appl. No. 15/422,944.
Notice of Allowance dated Jan. 17, 2019 in U.S. Appl. No. 15/626,720.
Office Action dated Apr. 19, 2018, which issued during the prosecution of U.S. Appl. No. 15/854,438.
Office Action dated Dec. 14, 2018, which issued during the prosecution of U.S. Appl. No. 15/920,517.
Office Action dated Dec. 17, 2018, which issued during the prosecution of U.S. Appl. No. 15/920,515.
Office Action dated Dec. 17, 2018, which issued during the prosecution of U.S. Appl. No. 15/920,533.
Office Action dated Dec. 17, 2018, which issued during the prosecution of U.S. Appl. No. 15/920,538.
Office Action dated Dec. 17, 2018, which issued during the prosecution of U.S. Appl. No. 15/920,544.
Office Action dated Dec. 20, 2018, which issued during the prosecution of U.S. Appl. No. 15/900,164.
Office Action dated Dec. 21, 2018, which issued during the prosecution of U.S. Appl. No. 15/900,230.
Office Action dated Feb. 25, 2016, which issued during the prosecution of U.S. Appl. No. 14/867,752.
Office Action dated Jan. 27, 2015 from the Japanese Patent Office in Japanese Application No. 2013-053543, Machine Translation and corresponds to U.S. Appl. No. 14/209,065.
Office Action dated Jan. 31, 2018, which issued during the prosecution of U.S. Appl. No. 14/867,752.
Office Action dated Jul. 6, 2015, which issued during the prosecution of U.S. Appl. No. 14/209,065.
Office Action dated Mar. 13, 2015, which issued during the prosecution of U.S. Appl. No. 14/209,065.
Office Action dated Mar. 16, 2017, which issued during the prosecution of U.S. Appl. No. 14/867,752.
Office Action dated Mar. 24, 2016, which issued during the prosecution of U.S. Appl. No. 14/209,065.
Office Action dated Nov. 28, 2018, which issued during the prosecution of U.S. Appl. No. 15/900,080.
Office Action dated Nov. 28, 2018, which issued during the prosecution of U.S. Appl. No. 15/900,144.
Office Action dated Nov. 29, 2018, which issued during the prosecution of U.S. Appl. No. 15/380,309.
Office Action dated Nov. 29, 2018, which issued during the prosecution of U.S. Appl. No. 15/422,821.
Office Action dated Nov. 8, 2016 from the Japanese Patent Office in Japanese Application No. 2014-199022, Machine Translation and corresponds to U.S. Appl. No. 14/867,752.
Office Action dated Oct. 15, 2018, which issued during the prosecution of U.S. Appl. No. 15/854,403.
Office Action dated Oct. 19, 2016, which issued during the prosecution of U.S. Appl. No. 14/867,752.
Office Action dated Oct. 3, 2018, which issued during the prosecution of U.S. Appl. No. 15/280,195.
Office Action dated Oct. 5, 2017, which issued during the prosecution of U.S. Appl. No. 15/241,286.
Office Action dated Oct. 5, 2017, which issued during the prosecution of U.S. Appl. No. 15/241,297.
Office Action dated Oct. 5, 2017, which issued during the prosecution of U.S. Appl. No. 15/241,631.
Office Action dated Oct. 5, 2017, which issued during the prosecution of U.S. Appl. No. 15/378,907.
Office Action dated Sep. 10, 2015, which issued during the prosecution of U.S. Appl. No. 14/209,065.
Office Action dated Sep. 19, 2014, which issued during the prosecution of U.S. Appl. No. 14/209,065.
Office Action dated Sep. 26, 2017 issued by the Japanese Patent Office in JP Appln. No. 2014-265723, Machine Translation and corresponds to U.S. Appl. No. 14/978,834.
Office Action dated Sep. 26, 2017 issued by the Japanese Patent Office in JP Appln. No. 2015-249264, Machine Translation and corresponds to U.S. Appl. No. 14/757,555.
Office Action dated Sep. 28, 2018, which issued during the prosecution of U.S. Appl. No. 15/854,409.
Office Action dated Sep. 7, 2017, which issued during the prosecution of U.S. Appl. No. 14/867,752.
Office Action dated Dec. 25, 2018 in Japanese Application No. 2015-245144.
Office Action dated Dec. 25, 2018 in Japanese Application No. 2015-245145.
Office Action dated Dec. 25, 2018 in Japanese Application No. 2015-254192.
Office Action dated Jan. 10, 2019 in U.S. Appl. No. 15/899,430.
Office Action dated Nov. 14, 2018 in U.S. Appl. No. 16/100,289.
Notice of Allowance dated Oct. 11, 2018, which issued during the prosecution of U.S. Appl. No. 15/422,944.
Office Action dated May 4, 2018 which issued during the prosecution of U.S. Appl. No. 15/422,944.
U.S. Appl. No. 15/624,897, Allowed; RCE filed Nov. 21, 2018.
U.S. Appl. No. 15/624,792, Allowed; RCE filed Nov. 21, 2018.
U.S. Appl. No. 15/626,832, Allowed; RCE filed Nov. 21, 2018.
U.S. Appl. No. 15/625,428, Allowed Dec. 4, 2018; RCE Filed.
U.S. Appl. No. 15/380,336, Allowed; RCE filed Nov. 21, 2018.
U.S. Appl. No. 15/628,814, Pending.
U.S. Appl. No. 15/626,355, Pending.
U.S. Appl. No. 15/443,206, Pending.
Office Action dated Dec. 19, 2018 in U.S. Appl. No. 15/900,345.
Office Action dated Dec. 19, 2018 in U.S. Appl. No. 15/900,379.
Office Action dated Dec. 21, 2018 in U.S. Appl. No. 15/900,160.
Office Action dated Feb. 5, 2019 in Japanese Application No. 2016-117339, Machine Translation; corresponds to U.S. Appl. No. 16/100,289.
Office Action dated Feb. 5, 2019 in Japanese Application No. 2016-123205, Machine Translation; corresponds to U.S. Appl. No. 15/620,916.
Office Action dated Feb. 5, 2019 in Japanese Application No. 2016-169871, Machine Translation; corresponds to U.S. Appl. No. 15/690,400.
Office Action dated Feb. 7, 2019 in U.S. Appl. No. 15/621,464.
Office Action dated Nov. 19, 2018 in U.S. Appl. No. 15/900,141.
Office Action dated Feb. 21, 2019 in U.S. Appl. No. 15/854,383.
Office Action dated Dec. 21, 2018 in U.S. Appl. No. 15/920,616.
Office Action dated Dec. 20, 2018 in U.S. Appl. No. 15/900,242.
Office Action dated Dec. 27, 2018 in U.S. Appl. No. 15/900,334.
Office Action dated Dec. 7, 2019 in U.S. Appl. No. 15/920,592.
Notice of Allowance dated Aug. 27, 2018 in U.S. Appl. No. 15/920,635.
"Introduction to TMR Magnetic Sensors", Anonymous, Mar. 12, 2015, MR Sensor Technology, pp. 1-5 (Year: 2015).
Notice of Allowance dated Apr. 16, 2019 in U.S. Appl. No. 15/625,428.
Notice of Allowance dated Mar. 13, 2019 in U.S. Appl. No. 16/100,289.
Notice of Allowance dated Mar. 18, 2019 in U.S. Appl. No. 15/626,355.

(56) References Cited

OTHER PUBLICATIONS

Notice of Allowance dated Mar. 18, 2019 in U.S. Appl. No. 15/628,814.
Office Action dated Apr. 15, 2019 in U.S. Appl. No. 16/182,083.
Office Action dated Apr. 16, 2019 in U.S. Appl. No. 16/232,165.
Office Action dated Feb. 26, 2019 in Japanese Application No. 2016-123207, Machine Translation corresponds to U.S. Appl. No. 15/619,012.
Office Action dated Feb. 26, 2019 in U.S. Appl. No. 15/380,336.
Office Action dated Feb. 26, 2019 in U.S. Appl. No. 15/624,792.
Office Action dated Feb. 26, 2019 in U.S. Appl. No. 15/624,897.
Office Action dated Feb. 26, 2019 in U.S. Appl. No. 15/626,832.
Office Action dated Feb. 28, 2019 in U.S. Appl. No. 15/920,518.
Office Action dated Feb. 5, 2019 in U.S. Appl. No. 16/038,339.
Office Action dated Mar. 15, 2019 in U.S. Appl. No. 15/280,195.
Office Action dated Mar. 15, 2019 in U.S. Appl. No. 15/619,012.
Office Action dated Mar. 15, 2019 in U.S. Appl. No. 15/627,696.
Office Action dated Mar. 15, 2019 in U.S. Appl. No. 15/690,906.
Office Action dated Mar. 18, 2019 in U.S. Appl. No. 15/442,961.
Office Action dated Mar. 19, 2019 in Japanese Application No. 2016-116261, Machine Translation corresponds to U.S. Appl. No. 15/614,876.
Office Action dated Mar. 19, 2019 in Japanese Application No. 2016-124515, Machine Translation corresponds to U.S. Appl. No. 15/621,464.
Office Action dated Mar. 19, 2019 in Japanese Application No. 2016-124529, Machine Translation corresponds to U.S. Appl. No. 15/628,814.
Office Action dated Mar. 19, 2019 in Japanese Application No. 2016-124932, Machine Translation corresponds to U.S. Appl. No. 15/626,720.
Office Action dated Mar. 19, 2019 in Japanese Application No. 2016-124933, Machine Translation corresponds to U.S. Appl. No. 15/627,696.
Office Action dated Mar. 19, 2019 in Japanese Application No. 2016-124935, Machine Translation corresponds to U.S. Appl. No. 15/626,355.
Office Action dated Mar. 19, 2019 in U.S. Appl. No. 15/443,094.
Office Action dated Mar. 21, 2019 in U.S. Appl. No. 15/900,144.
Office Action dated Mar. 21, 2019 in U.S. Appl. No. 16/160,377.
Office Action dated Mar. 27, 2019 in U.S. Appl. No. 15/690,400.
Office Action dated Mar. 6, 2019 in U.S. Appl. No. 15/854,403.
Office Action dated Mar. 7, 2019 in U.S. Appl. No. 15/854,439.
Office Action dated Mar. 5, 2019 in U.S. Appl. No. 15/443,026.
Notice of Allowance dated Apr. 30, 2019 in U.S. Appl. No. 15/380,309.
Notice of Allowance dated May 13, 2019 in U.S. Appl. No. 15/900,379.
Notice of Allowance dated May 14, 2019 in U.S. Appl. No. 15/422,821.
Notice of Allowance dated May 14, 2019 in U.S. Appl. No. 15/900,164.
Notice of Allowance dated May 15, 2019 in U.S. Appl. No. 15/900,106.
Notice of Allowance dated May 15, 2019 in U.S. Appl. No. 15/900,242.
Notice of Allowance dated May 16, 2019 in U.S. Appl. No. 15/614,876.
Notice of Allowance dated May 16, 2019 in U.S. Appl. No. 15/621,464.
Notice of Allowance dated May 24, 2019 in U.S. Appl. No. 15/900,345.
Notice of Allowance dated May 24, 2019 in U.S. Appl. No. 16/143,646.
Office Action dated Apr. 23, 2019 in Japanese Application No. 2016-169851, Machine Translation corresponds to U.S. Appl. No. 15/690,906.
Office Action dated Apr. 23, 2019 in Japanese Application No. 2016-182230, Machine Translation corresponds to U.S. Appl. No. 15/705,531.
Office Action dated Apr. 4, 2019 in U.S. Appl. No. 16/184,312.
Office Action dated May 23, 2019 in U.S. Appl. No. 15/388,911.
Notice of Allowance dated May 28, 2019 in U.S. Appl. No. 15/920,616.
Notice of Allowance dated May 29, 2019 in U.S. Appl. No. 15/900,160.
Notice of Allowance dated May 29, 2019 in U.S. Appl. No. 15/900,334.
Notice of Allowance dated May 30, 2019 in U.S. Appl. No. 15/900,230.
U.S. Appl. No. 15/052,115, Patented as U.S. Pat. No. 9,704,527.
U.S. Appl. No. 15/218,190, Patented as U.S. Pat. No. 9,721,606.
U.S. Appl. No. 15/280,195, Pending.
U.S. Appl. No. 15/422,821, Pending.
U.S. Appl. No. 15/422,944, Allowed.
U.S. Appl. No. 15/466,143, Patented as U.S. Pat. No. 9,837,116.
U.S. Appl. No. 15/619,012, Pending.
U.S. Appl. No. 15/624,897, Pending.
U.S. Appl. No. 15/624,792, Pending.
U.S. Appl. No. 15/626,832, Pending.
U.S. Appl. No. 15/625,428, Allowed.
U.S. Appl. No. 14/978,834, Patented as U.S. Pat. No. 9,721,605.
U.S. Appl. No. 14/757,555, Patented as U.S. Pat. No. 9,711,174.
U.S. Appl. No. 15/197,046, Patented as U.S. Pat. No. 9,721,607.
U.S. Appl. No. 15/380,336, Pending.
U.S. Appl. No. 15/614,876, Pending.
U.S. Appl. No. 15/620,916, Pending.
U.S. Appl. No. 15/621,464, Pending.
U.S. Appl. No. 15/626,720, Allowed.
U.S. Appl. No. 15/854,383, Pending.
U.S. Appl. No. 15/854,507, Patented as U.S. Pat. No. 9,984,716.
U.S. Appl. No. 15/854,439, Pending.
U.S. Appl. No. 15/854,506, Patented as U.S. Pat. No. 10,008,230.
U.S. Appl. No. 15/848,173, Allowed.
U.S. Appl. No. 15/628,814, Allowed.
U.S. Appl. No. 15/690,400, Pending.
U.S. Appl. No. 15/690,906, Pending.
U.S. Appl. No. 15/626,355, Allowed.
U.S. Appl. No. 15/627,696, Pending.
U.S. Appl. No. 14/870,618, Patented as U.S. Pat. No. 9,959,894.
U.S. Appl. No. 15/388,911, Pending.
U.S. Appl. No. 14/753,227, Patented as U.S. Pat. No. 9,601,146.
U.S. Appl. No. 15/380,309, Pending.
U.S. Appl. No. 15/388,864, Patented as U.S. Pat. No. 9,773,519.
U.S. Appl. No. 15/072,550, Patented as U.S. Pat. No. 9,704,525.
U.S. Appl. No. 15/615,871, Patented as U.S. Pat. No. 10,074,393.
U.S. Appl. No. 15/854,410, Patented as U.S. Pat. No. 9,972,351.
U.S. Appl. No. 15/378,907, Patented as U.S. Pat. No. 9,984,710.
U.S. Appl. No. 15/241,631, Patented as U.S. Pat. No. 10,026,435.
U.S. Appl. No. 14/209,065, Patented as U.S. Pat. No. 9,530,444.
U.S. Appl. No. 15/854,474, Patented as U.S. Pat. No. 9,978,414.
U.S. Appl. No. 15/854,403, Pending.
U.S. Appl. No. 15/241,297, Patented as U.S. Pat. No. 10,026,434.
U.S. Appl. No. 15/241,286, Patented as U.S. Pat. No. 10,026,433.
U.S. Appl. No. 15/464,991, Patented as U.S. Pat. No. 9,779,772.
U.S. Appl. No. 14/867,752, Patented as U.S. Pat. No. 10,026,430.
U.S. Appl. No. 15/854,438, Allowed.
U.S. Appl. No. 15/854,409, Allowed.
U.S. Appl. No. 15/443,026, Pending.
U.S. Appl. No. 15/920,782, Patented as U.S. Pat. No. 10,134,433.
U.S. Appl. No. 15/920,563, Allowed.
U.S. Appl. No. 15/920,533, Pending.
U.S. Appl. No. 15/900,144, Pending.
U.S. Appl. No. 15/900,080, Pending.
U.S. Appl. No. 15/900,230, Pending.
U.S. Appl. No. 15/900,164, Pending.
U.S. Appl. No. 15/920,518, Pending.
U.S. Appl. No. 15/899,587, Pending.
U.S. Appl. No. 15/899,430, Pending.
U.S. Appl. No. 15/920,515, Pending.
U.S. Appl. No. 15/920,517, Pending.
U.S. Appl. No. 15/920,538, Pending.
U.S. Appl. No. 15/920,544, Pending.

(56) References Cited

OTHER PUBLICATIONS

U.S. Appl. No. 15/920,768, Allowed.
U.S. Appl. No. 16/009,603 (the present Application), Allowed.
U.S. Appl. No. 16/182,083, Pending (Continuation of 15,920,768).
U.S. Appl. No. 15/705,531, Pending.
U.S. Appl. No. 16/232,165 Pending (Continuation of 15,854,438).
U.S. Appl. No. 16/100,289, Allowed.
U.S. Appl. No. 16/038,669, Pending.
U.S. Appl. No. 15/900,106, Pending.
U.S. Appl. No. 15/900,412, Patented as U.S. Pat. No. 10,062,403.
U.S. Appl. No. 15/900,141, Pending.
U.S. Appl. No. 15/900,160, Pending.
U.S. Appl. No. 15/900,345, Pending.
U.S. Appl. No. 15/900,379, Pending.
U.S. Appl. No. 16/012,018, Pending.
U.S. Appl. No. 15/920,616, Pending.
U.S. Appl. No. 15/900,242, Pending.
U.S. Appl. No. 15/900,334, Pending.
U.S. Appl. No. 15/920,592, Allowed.
U.S. Appl. No. 15/920,635, Patented as No. 10,170,144.
U.S. Appl. No. 16/160,377, Pending.
U.S. Appl. No. 15/443,094, Pending.
U.S. Appl. No. 15/442,9614, Pending.
U.S. Appl. No. 16/038,687, Pending.
U.S. Appl. No. 16/038,514, Pending.
U.S. Appl. No. 16/038,545, Pending.
U.S. Appl. No. 16/037,596, Pending.
U.S. Appl. No. 16/038,771, Pending.
U.S. Appl. No. 16/037,564, Pending.
U.S. Appl. No. 16/038,3395, Allowed.
U.S. Appl. No. 16/037,573, Pending.
U.S. Appl. No. 16/037,681, Pending.
U.S. Appl. No. 16/038,884, Pending.
U.S. Appl. No. 16/038,847, Pending.
U.S. Appl. No. 16/044,574, Allowed.

* cited by examiner

HEAD POSITIONING OF TIMING-BASED SERVO SYSTEM FOR MAGNETIC TAPE RECORDING DEVICE

CROSS-REFERENCE TO RELATED APPLICATIONS

This application claims priority under 35 U.S.C. 119 to Japanese Patent Application No. 2017-123039 filed on Jun. 23, 2017. The above application is hereby expressly incorporated by reference, in its entirety, into the present application.

BACKGROUND OF THE INVENTION

1. Field of the Invention

The present invention relates to a magnetic tape and a magnetic tape device.

2. Description of the Related Art

Magnetic recording media are divided into tape-shaped magnetic recording media and disk-shaped magnetic recording media, and tape-shaped magnetic recording media, that is, magnetic tapes (hereinafter, also simply referred to as "tapes") are mainly used for data storage such as data back-up or archive.

The recording of information on a magnetic tape is normally performed by recording a magnetic signal on a data band of the magnetic tape. Accordingly, data tracks are formed in the data band.

An increase in recording capacity (high capacity) of the magnetic tape is required in accordance with a great increase in information content in recent years. As means for realizing high capacity, a technology of disposing a larger amount of data tracks in a width direction of the magnetic tape by narrowing the width of the data track to increase recording density is used.

However, in a case where the width of the data track is narrowed and the recording and/or reproduction of magnetic signals is performed by allowing the running of the magnetic tape in a magnetic tape device (normally referred to as a "drive"), it is difficult that a magnetic head correctly follows the data tracks in accordance with the position change of the magnetic tape in the width direction, and errors may easily occur at the time of recording and/or reproduction. Thus, as means for preventing occurrence of such errors, a system using a head tracking servo using a servo signal (hereinafter, referred to as a "servo system") has been recently proposed and practically used (for example, see U.S. Pat. No. 5,689,384A).

SUMMARY OF THE INVENTION

In a magnetic servo type servo system among the servo systems, a servo signal (servo pattern) is formed in a magnetic layer of a magnetic tape, and this servo pattern is magnetically read to perform head tracking. More specific description is as follows.

First, a servo head reads a servo pattern to be formed in a magnetic layer (that is, reproduces a servo signal). A position of a magnetic head in a magnetic tape device is controlled in accordance with a value obtained by reading the servo pattern. Accordingly, in a case of transporting the magnetic tape in the magnetic tape device for recording and/or reproducing information, it is possible to increase an accuracy of the magnetic head following the data track, even in a case where the position of the magnetic tape is changed. For example, even in a case where the position of the magnetic tape is changed in the width direction with respect to the magnetic head, in a case of recording and/or reproducing information by transporting the magnetic tape in the magnetic tape device, it is possible to control the position of the magnetic head in the width direction of the magnetic tape in the magnetic tape device, by performing the head tracking servo. By doing so, it is possible to properly record information on the magnetic tape and/or properly reproduce information recorded on the magnetic tape in the magnetic tape device.

As the magnetic servo type servo system described above, a timing-based servo type system is widely used in recent years. In a timing-based servo type servo system (hereinafter, referred to as a "timing-based servo system"), a plurality of servo patterns having two or more different shapes are formed on a magnetic layer, and a position of a servo head is recognized by an interval of time in a case where the servo head has reproduced (read) two servo patterns having different shapes and an interval of time in a case where the servo head has reproduced two servo patterns having the same shapes. The position of the magnetic head in the width direction of the magnetic tape is controlled based on the position of the servo head recognized as described above.

Meanwhile, for the magnetic tape, it is also required to increase recording density (realize high-density recording) in accordance with a great increase in information content in recent years. As a method for achieving high-density recording, a method of decreasing a particle size of ferromagnetic powder included in a magnetic layer (hereinafter, referred to as "atomization") and increasing a filling percentage of the ferromagnetic powder in the magnetic layer is used. In regards to this point, as ferromagnetic powder for satisfying both the atomization and excellent magnetic properties, it is known that ferromagnetic hexagonal ferrite powder is suitable among various ferromagnetic powders. In addition, as an index of the particle size of the ferromagnetic powder, an activation volume which is a unit of magnetization reversal can be used.

In consideration of these circumstances, the inventors have studied the application of a magnetic tape including ferromagnetic hexagonal ferrite powder having a small activation volume as the ferromagnetic powder in a magnetic layer to a timing-based servo system. However, in such studies, it was clear that, a phenomenon which was not known in the related art occurred, in which an accuracy of a magnetic head following a data track (hereinafter, also referred to as "head positioning accuracy") is decreased in a timing-based servo system, in a magnetic tape including ferromagnetic hexagonal ferrite powder having an activation volume equal to or smaller than 1,600 $nm^3$ in a magnetic layer.

Therefore, an object of the invention is to improve head positioning accuracy of a timing-based servo system, in a magnetic tape including ferromagnetic hexagonal ferrite powder having an activation volume equal to or smaller than 1,600 $nm^3$ in a magnetic layer.

According to one aspect of the invention, there is provided a magnetic tape comprising: a non-magnetic support; and a magnetic layer including ferromagnetic powder and a binding agent on the non-magnetic support, in which the magnetic layer includes a timing-based servo pattern, the ferromagnetic powder is ferromagnetic hexagonal ferrite powder having an activation volume equal to or smaller than 1,600 $nm^3$, an intensity ratio (Int(110)/Int(114); hereinafter, also referred to as "X-ray diffraction (XRD) intensity ratio") of a peak intensity Int(110) of a diffraction peak of a (110) plane with respect to a peak intensity Int(114) of a diffraction peak of a (114) plane of a hexagonal ferrite crystal structure obtained by an X-ray diffraction analysis of the magnetic layer by using an In-Plane method is 0.5 to 4.0, a vertical direction squareness ratio of the magnetic tape is 0.65 to 1.00, and an edge shape of the timing-based servo pattern specified by magnetic force microscope observation is a shape in which a difference ($L_{99.9}-L_{0.1}$) of a value $L_{99.9}$ of a cumulative distribution function of 99.9% of a position shift width from an ideal shape in a longitudinal direction of the magnetic tape and a value $L_{0.1}$ of the cumulative distribution function of 0.1% (hereinafter, also simply referred to as a "difference ($L_{99.9}-L_{0.1}$)") is equal to or smaller than 180 nm. In the specification, the longitudinal direction of the magnetic tape may be simply referred to as a longitudinal direction and the width direction of the magnetic tape may be referred to as a tape width direction or simply a width direction. The "width direction" of the invention and the specification means a direction orthogonal to the longitudinal direction. In addition, in the invention and the specification, the ferromagnetic hexagonal ferrite powder means an aggregate of a plurality of ferromagnetic hexagonal ferrite particles. Hereinafter, particles (ferromagnetic hexagonal ferrite particles) configuring the ferromagnetic hexagonal ferrite powder are also referred to as "hexagonal ferrite particles" or simply "particles". The aggregate not only includes an aspect in which particles configuring the aggregate are directly in contact with each other, but also includes an aspect in which a binding agent, an additive, or the like is sandwiched between the particles. The points described above are also applied to various powders such as non-magnetic powder of the invention and the specification, in the same manner.

The "activation volume" is a unit of magnetization reversal. Regarding the activation volume described in the invention and the specification, magnetic field sweep rates of a coercivity Hc measurement part at time points of 3 minutes and 30 minutes are measured by using an oscillation sample type magnetic-flux meter (measurement temperature: 23° C.±1° C.), and the activation volume is a value acquired from the following relational expression of Hc and an activation volume V.

$$Hc=2Ku/Ms\{1-[(kT/KuV)\ln(At/0.693)]^{1/2}\}$$

[In the expression, Ku: anisotropy constant, Ms: saturation magnetization, k: Boltzmann's constant, T: absolute temperature, V: activation volume, A: spin precession frequency, and t: magnetic field reversal time]

The "timing-based servo pattern" of the invention and the specification is a servo pattern with which the head tracking of the timing-based servo system can be performed. The timing-based servo system is as described above. The servo pattern with which the head tracking of the timing-based servo system can be performed, is formed in the magnetic layer by a servo pattern recording head (also referred to as a "servo write head") as a plurality of servo patterns having two or more different shapes. As an example, the plurality of servo patterns having two or more different shapes are continuously disposed at regular intervals for each of the plurality of servo patterns having the same shapes. As another example, different types of the servo patterns are alternately disposed. In regards to that the servo patterns have the same shape, a position shift of edge shapes of the servo patterns is not considered. The shapes of the servo pattern with which the head tracking of the timing-based servo system can be performed and the disposition thereof on the servo band are well known and specific aspect thereof will be described later. Hereinafter, the timing-based servo pattern is also simply referred to as a servo pattern. In the invention and the specification, the edge shape of the timing-based servo pattern specified by magnetic force microscope observation is a shape of an edge (edge side) positioning on a downstream side with respect to a magnetic tape running direction (hereinafter, also simply referred to as a "running direction") in a case of recording a magnetic signal (information). In the specification, as heads, a "servo write head", a "servo head", and a "magnetic head" are disclosed. The servo write head is a head which performs recording of a servo signal as described above (that is, formation of a servo pattern). The servo head is a head which performs reproduction of the servo signal (that is, reading of the servo pattern), and the magnetic head is a head which performs recording and/or reproduction of information, unless otherwise noted.

Next, the edge shape of the timing-based servo pattern specified by magnetic force microscope observation, the difference ($L_{99.9}-L_{0.1}$) of a value $L_{99.9}$ of a cumulative distribution function of 99.9% of a position shift width from an ideal shape of this edge shape in a longitudinal direction of the magnetic tape and a value $L_{0.1}$ of the cumulative distribution function of 0.1%, and the ideal shape thereof of the invention and the specification will be described.

Hereinafter, a linear servo pattern which continuously extends from one side to the other side in the width direction of the magnetic tape and is tilted with respect to the width direction of the magnetic tape by an angle α will be mainly described as an example. The angle α is an angle formed by a line segment connecting two end portions of the edge of the servo pattern, in the tape width direction, positioning on a downstream side with respect to the running direction of the magnetic tape in a case of recording a magnetic signal (information), and the width direction of the magnetic tape. This point will also be described, hereinafter.

For example, in a magnetic tape used in a linear recording system which is widely used as a recording system of the magnetic tape device, a plurality of regions (referred to as "servo bands") where servo patterns are formed are normally present in the magnetic layer along the longitudinal direction of the magnetic tape. A region interposed between two servo bands is referred to as a data band. The recording of information (magnetic signal) is performed on the data band and a plurality of data tracks are formed in each data band along the longitudinal direction. FIG. 1 shows an example of disposition of data bands and servo bands. In FIG. 1, a plurality of servo bands 10 are disposed to be interposed between guide bands 12 in a magnetic layer of a magnetic tape 1. A plurality of regions 11 each of which is interposed between two servo bands are data bands. The servo pattern is a magnetized region and is formed by magnetizing a specific region of the magnetic layer by a servo write head. The region magnetized by the servo write head (position where a servo pattern is formed) is determined by standards. For example, in an LTO Ultrium format tape which is based on a local standard, a plurality of servo patterns tilted in a tape width direction as shown in FIG. 2 are formed on a servo band, in a case of manufacturing a magnetic tape. Specifically, in FIG. 2, a servo frame SF on the servo band 10 is configured with a servo sub-frame 1 (SSF1) and a servo sub-frame 2 (SSF2). The servo sub-frame 1 is configured with an A burst (in FIG. 2, reference numeral A) and a B burst (in FIG. 2, reference numeral B). The A burst is configured with servo patterns A1 to A5 and the B burst is configured with servo patterns B1 to B5. Meanwhile, the servo sub-frame 2 is configured with a C burst (in FIG. 2, reference numeral C) and a D burst (in FIG. 2, reference numeral D). The C burst is configured with servo patterns C1 to C4 and the D burst is configured with servo patterns D1 to D4. Such 18 servo patterns are disposed in the sub-frames in the arrangement of 5, 5, 4, 4, as the sets of 5 servo patterns and 4 servo patterns, and are used for recognizing the servo frames. FIG. 2 shows one servo frame, but, a plurality of servo frames are disposed in each servo band in a running direction. In FIG. 2, an arrow shows the running direction. The proceeding direction of the arrow is an upstream side and the opposite direction thereof is a downstream side.

FIG. 3 and FIG. 4 are explanatory diagrams of the angle α. Regarding the servo patterns tilted towards the upstream side of the running direction such as the servo patterns A1 to A5 and C1 to C4 in the servo patterns shown in FIG. 2, an angle formed by a line segment connecting two end portions of an edge $E_L$ on the downstream side (in FIG. 3, broken line L1) and the tape width direction (in FIG. 3, broken line L2) is set as the angle α. Meanwhile, Regarding the servo patterns tilted towards the downstream side of the running direction such as the servo patterns B1 to B5 and D1 to D4, an angle formed by a line segment connecting two end portions of an edge $E_L$ on the downstream side (in FIG. 4, broken line L1) and the tape width direction (in FIG. 4, broken line L2) is set as the angle α. The angle α is generally called an azimuth angle, and is determined by setting of the servo write head in a case of forming a magnetized region (servo pattern) on the servo band.

In a case where the servo pattern is ideally formed, in a case of forming a magnetized region (servo pattern) on the servo band, the edge shape of the servo pattern tilted by the angle α with respect to the width direction of the magnetic tape coincides with the shape of the line segment connecting the two end portions of the edge (in FIGS. 3 and 4, broken line L1). That is, the edge shape becomes a linear line. Accordingly, in each portion on the edge, a position shift width from the ideal shape in the longitudinal direction of the magnetic tape (hereinafter, also simply referred to as a "position shift width") becomes zero. However, during intensive studies, the inventors have considered that, in the magnetic tape including the ferromagnetic hexagonal ferrite powder having an activation volume equal to or smaller than 1,600 $nm^3$ in the magnetic layer as the ferromagnetic powder, the edge shape of the servo pattern highly tends to be shifted from the ideal shape as shown in an example of FIG. 5, and an increase in position shift width and an increase in variation of the values of the position shift width in each portion of the edge may cause a decrease in head positioning accuracy of the timing-based servo system. The inventors have surmised that, in the magnetic tape including the ferromagnetic hexagonal ferrite powder having an activation volume equal to or smaller than 1,600 $nm^3$ in the magnetic layer as the ferromagnetic powder, a reason of a high tendency of the shift of the edge shape of the servo pattern from the ideal shape may be a magnetic strain which easily occurs in the magnetic layer due to a decrease in activation volume to be equal to or smaller than 1,600 $nm^3$. However, the above description is merely a surmise.

In regards to this point, it is thought that, in order to prevent the edge shape of the servo pattern from shifting from the ideal shape, capacity of the servo write head is increased, specifically, a servo write head having a great magnetic field (leakage magnetic field) is used. However, although the inventors have conducted intensive studies, it was clear that, there is a limitation for the edge shape of the servo pattern to be close to the ideal shape, in the magnetic tape including the ferromagnetic hexagonal ferrite powder having an activation volume equal to or smaller than 1,600 $nm^3$ in the magnetic layer as the ferromagnetic powder, only by increasing capacity of the servo write head. Therefore, the inventors have thought that it is necessary to make the edge shape of the servo pattern close to the ideal shape by performance of the magnetic tape where the servo patterns are formed, and have further made intensive studies regarding performance of the magnetic tape. As a result, it is newly found that, by setting the XRD intensity ratio to be 0.5 to 4.0 and the vertical direction squareness ratio to be 0.65 to 1.00, it is possible to form a servo pattern having an edge shape close to the ideal shape, in the magnetic tape including the ferromagnetic hexagonal ferrite powder having an activation volume equal to or smaller than 1,600 $nm^3$ in the magnetic layer as the ferromagnetic powder. In addition, the inventors have newly found that it is possible to improve the head positioning accuracy of the timing-based servo system due to the above formation, and have completed the magnetic tape.

The difference ($L_{99.9}-L_{0.1}$) is a value which may be an index showing a small position shift width at each position of the edge of the servo pattern from the ideal shape and a small variation of the value of the position shift width at each portion of the edge. The difference ($L_{99.9}-L_{0.1}$) is a value obtained by the following method.

A surface of the magnetic layer of the magnetic tape where the servo pattern is formed is observed with a magnetic force microscope (MFM). A measurement range is set as a range where five servo patterns are included. For example, in a LTO Ultrium format tape, the measurement range is set to have a size of 90 μm×90 μm, and thus, five servo patterns of the A burst or the B burst can be observed. The servo pattern (magnetized region) is extracted by performing measurement (rough measurement) of the measurement range at a pitch of 100 nm. In the invention and the specification, a term, the surface of the magnetic layer is used as the same meaning as the surface of the magnetic tape on the magnetic layer side.

Then, in order to detect a boundary between a magnetized region and a non-magnetized region in the edge of the servo pattern positioning on the downstream side with respect to the running direction, a magnetic profile is obtained by performing the measurement in the vicinity of the boundary at a pitch of 5 nm. In a case where the obtained magnetic profile is tilted with respect to the width direction of the magnetic tape by the angle α, rotation correction is performed so that the magnetic profile follows along the magnetic tape width direction (so that α=0°) by analysis software. Then, a position coordinate of a peak value of each profile measured at a pitch of 5 nm is calculated by analysis software. The position coordinate of the peak value shows a position of a boundary between the magnetized region and the non-magnetized region. The position coordinate is, for example, specified by an xy coordinate system in which the running direction is on the x coordinate and the width direction is on the y coordinate.

In an example of a case where the ideal shape is a linear line and the position coordinate of the position on the linear line is shown as (x,y)=(a,b), in a case where the edge shape actually obtained (position coordinate of the boundary) coincides with the ideal shape, the position coordinate to be calculated is (x,y)=(a,b). In this case, the position shift width is zero. On the other hand, in a case where the edge shape actually obtained is shifted from the ideal shape, the x coordinate of the position of the boundary where y=b becomes x=a+c or x=a−c. The coordinate of x=a+c shows, for example, a case of being shifted to the upstream side with respect to the running direction by a width c, and the coordinate of x=a−c shows, for example, a case of being shifted to the downstream side with respect to the running direction by the width c (that is, −c, in a case of using the upstream side as a reference). Here, c is the position shift width. That is, an absolute value of the position shift width of the x coordinate from the ideal shape is the position shift width from the ideal shape in the longitudinal direction of the magnetic tape. By doing so, the position shift width at each portion of the edge on the downstream side of the running direction obtained by the measurement at a pitch of 5 nm is obtained.

Cumulative distribution functions are obtained from the value obtained regarding each servo pattern by analysis software. From the obtained cumulative distribution functions, a value $L_{99.9}$ of a cumulative distribution function of 99.9% and a value $L_{0.1}$ of the cumulative distribution function of 0.1% are obtained, and a difference ($L_{99.9}-L_{0.1}$) regarding each servo pattern is obtained from the obtained values.

The above measurement is performed in measurement ranges at three different portions (measurement number N=3).

An arithmetical mean of the difference ($L_{99.9}-L_{0.1}$) obtained regarding each servo pattern is defined as the difference ($L_{99.9}-L_{0.1}$) of the magnetic tape.

The "ideal shape" of the edge shape of the servo pattern of the invention and the specification is an edge shape, in a case where the servo pattern is formed without any position shift. For example, in one aspect, the servo pattern is a linear servo pattern which continuously or discontinuously extends from one side to the other side in the width direction of the magnetic tape. The "linear shape" regarding the servo pattern is a pattern shape which does not include a curved portion, regardless of the position shift of the edge shape. The "continuous" state means extending from one side to the other side in the tape width direction without any inflection point of a tilt angle and any break. An example of a servo pattern which continuously extends from one side to the other side in the width direction of the magnetic tape is the servo pattern shown in FIG. 2. On the other hand, the "discontinuous" state means extending with one or more inflection points of a tilt angle and/or with breaks at one or more portions. A shape extending with an inflection point of a tilt angle but without any break is a so-called broken line shape. An example of a discontinuous servo pattern which extends from one side to the other side in the tape width direction with one inflection point of a tilt angle and without any break is a servo pattern shown in FIG. 6. Meanwhile, an example of a discontinuous servo pattern which extends from one side to the other side in the tape width direction with break at one portion and without any inflection point of a tilt angle is a servo pattern shown in FIG. 7. In addition, an example of a discontinuous servo pattern which extends from one side to the other side in the tape width direction with one inflection point of a tilt angle and break at one portion is a servo pattern shown in FIG. 8.

Regarding the linear servo pattern which continuously extends from one side to the other side in the tape width direction, the "ideal shape" of the edge shape is a shape (linear shape) of a line segment connecting two end portions of the edge on the downstream side of the running direction of the linear servo pattern. For example, the ideal shape of the linear servo pattern shown in FIG. 2 is a shape of a linear line shown as L1 in FIG. 3 or FIG. 4. Meanwhile, the ideal shape of the linear servo pattern which discontinuously extends, is a shape (linear shape) of a line segment connecting one end and the other end of a portion where the tilt angle is the same, regarding the shape having the inflection point of the tilt angle. In addition, regarding the shape which extends with breaks at one or more portions, the ideal shape is a shape (linear shape) of a line segment connecting one end and the other end of each portion which continuously extends. For example, regarding servo patterns shown in FIG. 6, the ideal shapes are shapes of a line segment connecting e1 and e2 and a line segment connecting e2 and e3. Regarding servo patterns shown in FIG. 7, the ideal shapes are shapes of a line segment connecting e4 and e5 and a line segment connecting e6 and e7. Regarding servo patterns shown in FIG. 8, the ideal shapes are shapes of a line segment connecting e8 and e9 and a line segment connecting e10 and e11.

Hereinabove, the linear servo pattern has been described as an example. However, the servo pattern may be a servo pattern in which the ideal shape of the edge shape is a curved shape. For example, a servo pattern in which an edge shape of a downstream side with respect to the running direction is ideally a partial arc shape, the difference ($L_{99.9}-L_{0.1}$) can be obtained from the position shift width obtained by the position coordinate of the edge shape of the downstream side with respect to the running direction, obtained by the magnetic force microscope, with respect to the position coordinate of the partial arc shape.

As the magnetic force microscope used in the above measurement, a magnetic force microscope which is commercially available or has a well-known configuration is used in a frequency modulation (FM) mode. As a probe of the magnetic force microscope, for example, SSS-MFMR (official radius of curvature: 15 nm) manufactured by Nano-World AG can be used. A distance between the surface of the magnetic layer and a distal end of the probe in a case of the magnetic force microscope observation is set to be 20 to 50 nm.

In addition, as the analysis software, commercially available analysis software, or analysis software using a well-known arithmetic expression can be used.

In one aspect, the timing-based servo pattern may be a linear servo pattern which continuously extends from one side to the other side in the width direction of the magnetic tape and which is tilted with respect to the width direction by an angle of α, and the ideal shape may be a linear shape extending in a direction of the angle α.

In one aspect, the vertical direction squareness ratio of the magnetic tape may be 0.65 to 0.90.

In one aspect, the difference ($L_{99.9}-L_{0.1}$) may be equal to or smaller than 150 nm.

In one aspect, the activation volume of the ferromagnetic hexagonal ferrite powder may be 800 $nm^3$ to 1,600 $nm^3$.

In one aspect, the magnetic tape may further comprise a non-magnetic layer including non-magnetic powder and a binding agent between the non-magnetic support and the magnetic layer.

According to another aspect of the invention, there is provided a magnetic tape device comprising: the magnetic tape; a magnetic head; and a servo head.

According to one aspect of the invention, it is possible to provide a magnetic tape in which a servo pattern is formed and a head positioning accuracy in a case of drive running in a timing-based servo system is improved, and a magnetic tape device which records and/or reproduces a magnetic signal on this magnetic tape.

DESCRIPTION OF THE PREFERRED EMBODIMENTS

Magnetic Tape

Figure 1:
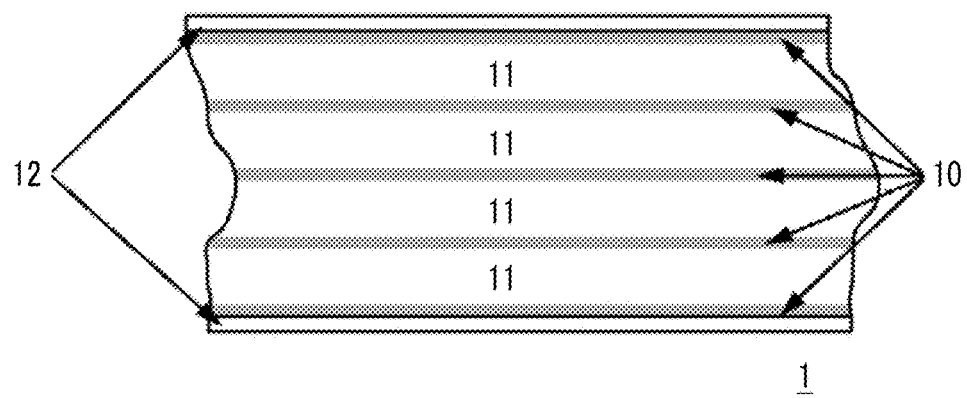
FIG. 1 shows an example of disposition of data bands and servo bands.

One aspect of the invention relates to a magnetic tape including: a non-magnetic support; and a magnetic layer including ferromagnetic powder and a binding agent on the non-magnetic support, in which the magnetic layer includes a timing-based servo pattern, the ferromagnetic powder is a ferromagnetic hexagonal ferrite powder having an activation volume equal to or smaller than 1,600 nm$^3$, an intensity ratio (Int(110)/Int(114)) of a peak intensity Int(110) of a diffraction peak of a (110) plane with respect to a peak intensity Int(114) of a diffraction peak of a (114) plane of a hexagonal ferrite crystal structure obtained by an X-ray diffraction analysis of the magnetic layer by using an In-Plane method is 0.5 to 4.0, a vertical direction squareness ratio of the magnetic tape is 0.65 to 1.00, and an edge shape of the timing-based servo pattern specified by magnetic force microscope observation is a shape in which a difference $(L_{99.9}-L_{0.1})$ of a value $L_{99.9}$ of a cumulative distribution function of 99.9% of a position shift width from an ideal shape in a longitudinal direction of the magnetic tape and a value $L_{0.1}$ of the cumulative distribution function of 0.1% is equal to or smaller than 180 nm.

Hereinafter, the magnetic tape will be described later more specifically. The specification includes a surmise of the inventors. The invention is not limited to such a surmise. In addition, in the specification, exemplary description may be made with reference to the drawings. However, the invention is not limited to the exemplified aspects.

Activation Volume

The magnetic layer of the magnetic tape includes ferromagnetic hexagonal ferrite powder having an activation volume equal to or smaller than 1,600 nm$^3$. As a result of studies of the inventors, it is clear that, in the magnetic tape including ferromagnetic hexagonal ferrite powder having an activation volume equal to or smaller than 1,600 nm$^3$ in the magnetic layer, a phenomenon of a decrease in head positioning accuracy occurs, which is not seen in a magnetic tape including ferromagnetic hexagonal ferrite powder having an activation volume greater than 1,600 nm$^3$ in a magnetic layer. Such a decrease in positioning accuracy can be prevented by controlling the difference $(L_{99.9}-L_{0.1})$ to be equal to or smaller than 180 nm. The difference $(L_{99.9}-L_{0.1})$ will be further described later. The activation volume of the ferromagnetic hexagonal ferrite powder is equal to or smaller than 1,600 nm$^3$, and may be, for example, equal to or smaller than 1,500 nm$^3$ or equal to or smaller than 1,400 nm$^3$. Generally, it can be said that a small activation volume is suitable for high-density recording. Here, the activation volume of the ferromagnetic hexagonal ferrite powder included in the magnetic layer of the magnetic tape may be equal to or smaller than 1,600 nm$^3$. Meanwhile, from a viewpoint of stability of magnetization, a lower limit of the activation volume is, for example, preferably equal to or greater than 800 nm$^3$, more preferably equal to or greater than 1,000 nm$^3$, and even more preferably equal to or greater than 1,200 nm$^3$.

Regarding ferromagnetic hexagonal ferrite powder present as powder, the activation volume described above can be obtained by using the powder as a measurement sample. Meanwhile, regarding ferromagnetic hexagonal ferrite powder included in the magnetic layer of the magnetic tape, powder can be collected from the magnetic layer to obtain a measurement sample. The collecting of the measurement sample can be performed by the following method, for example.

1. 1. The surface treatment is performed with respect to the surface of the magnetic layer with a plasma reactor manufactured by Yamato Scientific Co., Ltd. for 1 minute to 2 minutes, and an organic component (binding agent and the like) on the surface of the magnetic layer is incinerated and removed.

2. A filter paper dipped in an organic solvent such as cyclohexanone or acetone is bonded to an edge portion of a metal rod, the surface of the magnetic layer subjected to the treatment of 1. is rubbed thereon, the component of the magnetic layer is peeled off and transferred to the filter paper from the magnetic tape.

3. The component peeled in 2. is shaken off to fall into an organic solvent such as cyclohexanone or acetone (the filter paper is put into the organic solvent and the component is shaken off by an ultrasonic disperser), the organic solvent is dried, and the peeled component is extracted.

4. The component scraped off in 3. is put into a sufficiently washed glass test tube, for example, approximately 20 ml of n-butylamine is added thereto, and the glass test tube is sealed (the amount of n-butylamine capable of decomposing the remaining organic component without being incinerated is added).

5. The glass test tube is heated at an internal temperature of 170° C. for 20 hours or longer, and the organic component is decomposed.

6. The precipitate after the decomposition in 5. is sufficiently washed with pure water and dried, and powder is extracted.

7. A neodymium magnet is brought close to the powder collected in 6. and the adsorbed powder (that is, ferromagnetic hexagonal ferrite powder) is extracted.

With the steps described above, the ferromagnetic hexagonal ferrite powder for measuring the activation volume can be collected from the magnetic layer. The ferromagnetic hexagonal ferrite powder is practically not damaged due to the treatment described above, and thus, the measurement of the activation volume of the ferromagnetic hexagonal ferrite powder in a state of being included in the magnetic layer can be performed by the method described above.

Details of the ferromagnetic hexagonal ferrite powder included in the magnetic layer of the magnetic tape will be described later. Hereinafter, unless otherwise noted, the ferromagnetic hexagonal ferrite powder indicates ferromagnetic hexagonal ferrite powder having an activation volume equal to or smaller than 1,600 nm$^3$.

Difference $(L_{99.9}-L_{0.1})$

The method of measuring and calculating the difference $(L_{99.9}-L_{0.1})$ of the timing-based servo pattern included in the magnetic tape is as described above. It is determined that, in the magnetic tape including the ferromagnetic hexagonal ferrite powder having an activation volume equal to or smaller than 1,600 nm$^3$ in the magnetic layer, by setting the difference ($L_{99.9}-L_{0.1}$) to be equal to or smaller than 180 nm, it is possible to improve head positioning accuracy of the timing-based servo system. In addition, as a result of intensive studies of the inventors, it is clear that it is possible to set the difference ($L_{99.9}-L_{0.1}$) to be equal to or smaller than 180 nm by setting the XRD intensity ratio to be 0.5 to 4.0 and the vertical direction squareness ratio to be 0.65 to 1.00.

The difference ($L_{99.9}-L_{0.1}$) is equal to or smaller than 180 nm. In a case where the difference ($L_{99.9}-L_{0.1}$) is equal to or smaller than 180 nm, it is possible to improve head positioning accuracy of the timing-based servo system, in the magnetic tape including the ferromagnetic hexagonal ferrite powder having an activation volume equal to or smaller than 1,600 nm$^3$ in the magnetic layer. The difference ($L_{99.9}-L_{0.1}$) can be, for example, equal to or smaller than 170 nm, equal to or smaller than 160 nm, equal to or smaller than 150 nm, equal to or smaller than 140 nm, equal to or smaller than 130 nm, equal to or smaller than 120 nm, equal to or smaller than 110 nm, or equal to or smaller than 100 nm. As a value of the difference ($L_{99.9}-L_{0.1}$) decrease, the head positioning accuracy tends to be improved. In addition, the difference ($L_{99.9}-L_{0.1}$) can be, for example, equal to or greater than 50 nm, equal to or greater than 60 nm, or equal to or greater than 70 nm. Here, the difference ($L_{99.9}-L_{0.1}$) may be lower than the lower limit exemplified above, as long as it is equal to or smaller than 180 nm. It is difficult to set the difference ($L_{99.9}-L_{0.1}$) to be equal to or smaller than 180 nm, only by simply increasing capacity of the servo write head (specifically, using a servo write head having a great leakage magnetic field). With respect to this, it is possible to realize the difference ($L_{99.9}-L_{0.1}$) equal to or smaller than 180 nm, in the magnetic tape including the ferromagnetic hexagonal ferrite powder having an activation volume equal to or smaller than 1,600 nm$^3$ in the magnetic layer, by setting the XRD intensity ratio to be 0.5 to 4.0 and the vertical direction squareness ratio to be 0.65 to 1.00.

XRD Intensity Ratio and Vertical Direction Squareness Ratio

Next, the XRD intensity ratio and the vertical direction squareness ratio will be described.

The magnetic tape of the magnetic tape device includes ferromagnetic hexagonal ferrite powder having an activation volume equal to or smaller than 1,600 nm$^3$ in the magnetic layer. As described above, the inventors have thought that a magnetic strain which easily occurs in the magnetic layer due to a decrease in activation volume of the ferromagnetic hexagonal ferrite powder to be equal to or smaller than 1,600 nm$^3$ may cause a shift of the edge shape of the servo pattern from the ideal shape. The inventors have surmised that this shift of the edge shape of the servo pattern from the ideal shape may be a reason of a decrease in head positioning accuracy of the timing-based servo system.

In regards to the points described above, the inventors have surmised that particles affecting magnetic properties of the ferromagnetic hexagonal ferrite powder (aggregate of particles) (hereinafter, also referred to as "former particles") and particles which are considered not to affect or slightly affects the magnetic properties thereof (hereinafter, also referred to as "latter particles") are included in the ferromagnetic hexagonal ferrite powder included in the magnetic layer. It is considered that the latter particles are, for example, fine particles generated due to partial chipping of particles due to a dispersion process performed at the time of preparing a magnetic layer forming composition. The inventors have thought that, in the particles included in the ferromagnetic hexagonal ferrite powder included in the magnetic layer, the former particles are particles causing the diffraction peak in the X-ray diffraction analysis using the In-Plane method, and since the latter particles are fine, the latter particles do not or hardly affect the diffraction peak. Accordingly, it is surmised that it is possible to control a state of the particles affecting the magnetic properties of the ferromagnetic hexagonal ferrite powder present in the magnetic layer, based on the intensity of the diffraction peak caused by the X-ray diffraction analysis of the magnetic layer using the In-Plane method. The inventors have thought that the XRD intensity ratio is an index regarding this point.

Meanwhile, the vertical direction squareness ratio is a ratio of residual magnetization with respect to saturation magnetization measured in a direction vertical to the surface of the magnetic layer and this value decreases, as a value of the residual magnetization decreases. It is surmised that, since the latter particles are fine and hardly hold magnetization, as a large amount of the latter particles is included in the magnetic layer, the vertical direction squareness ratio tends to decrease. Accordingly, the inventors have thought that the vertical direction squareness ratio may be an index for the amount of the latter particles (fine particles) present in the magnetic layer.

The inventors have surmised that, in the magnetic tape in which a magnetic strain easily occurs in the magnetic layer, in a case where any measures are not prepared, due to due to a decrease in activation volume of the ferromagnetic hexagonal ferrite powder to be equal to or smaller than 1,600 nm$^3$, the setting of the XRD intensity ratio to be 0.5 to 4.0 and the vertical direction squareness ratio to be 0.65 to 1.00 respectively contribute to the prevention of occurrence of a magnetic strain in the magnetic layer as follows.

It is thought that the XRD intensity ratio of 0.5 to 4.0 means that the former particles are suitably arranged in the magnetic layer and the inventors have surmised that this contributes to the prevention of occurrence of a magnetic strain in the magnetic layer. In addition, it is thought that, since the latter particles are fine, magnetization reversal easily occurs. It is thought that the vertical direction squareness ratio of 0.65 to 1.00 means the amount of latter particle which is easily subjected to magnetization reversal is small, and it is surmised that this also contributes to the prevention of the prevention of occurrence of a magnetic strain in the magnetic layer.

However, the above description is merely a surmise and the invention is not limited thereto.

XRD Intensity Ratio

The magnetic tape includes ferromagnetic hexagonal ferrite powder in the magnetic layer. The XRD intensity ratio is obtained by the X-ray diffraction analysis of the magnetic layer including the ferromagnetic hexagonal ferrite powder by using the In-Plane method. Hereinafter, the X-ray diffraction analysis performed by using the In-Plane method is also referred to as "In-Plane XRD". The In-Plane XRD is performed by irradiating the surface of the magnetic layer with the X-ray by using a thin film X-ray diffraction device under the following conditions. A measurement direction is a longitudinal direction of the magnetic tape.

Cu ray source used (output of 45 kV, 200 mA)

Scan conditions: 0.05 degree/step, 0.1 degree/min in a range of 20 to 40 degrees Optical system used: parallel optical system Measurement method: 2θχ scan (X-ray incidence angle of 0.25°)

The values of the conditions are set values of the thin film X-ray diffraction device. As the thin film X-ray diffraction device, a well-known device can be used. As an example of the thin film X-ray diffraction device, Smart Lab manufactured by Rigaku Corporation. A sample to be subjected to the In-Plane XRD analysis is a tape sample cut out from the magnetic tape which is a measurement target, and the size and the shape thereof are not limited, as long as the diffraction peak which will be described later can be confirmed.

As a method of the X-ray diffraction analysis, thin film X-ray diffraction and powder X-ray diffraction are used. In the powder X-ray diffraction, the X-ray diffraction of the powder sample is measured, whereas, according to the thin film X-ray diffraction, the X-ray diffraction of a layer or the like formed on a substrate can be measured. The thin film X-ray diffraction is classified into the In-Plane method and an Out-Of-Plane method. The X-ray incidence angle at the time of the measurement is 5.00° to 90.00° in a case of the Out-Of-Plane method, and is generally 0.20° to 0.50°, in a case of the In-Plane method. In the In-Plane XRD of the invention and the specification, the X-ray incidence angle is 0.25° as described above. In the In-Plane method, the X-ray incidence angle is smaller than that in the Out-Of-Plane method, and thus, a depth of penetration of the X-ray is shallow. Accordingly, according to the X-ray diffraction analysis by using the In-Plane method (In-Plane XRD), it is possible to perform the X-ray diffraction analysis of a surface portion of a measurement target sample. Regarding the tape sample, according to the In-Plane XRD, it is possible to perform the X-ray diffraction analysis of the magnetic layer. The XRD intensity ratio is an intensity ratio (Int(110)/Int(114)) of a peak intensity Int(110) of a diffraction peak of a (110) plane with respect to a peak intensity Int(114) of a diffraction peak of a (114) plane of a hexagonal ferrite crystal structure, in X-ray diffraction spectra obtained by the In-Plane XRD. The term Int is used as abbreviation of intensity. In the X-ray diffraction spectra obtained by In-Plane XRD (vertical axis: intensity, horizontal axis: diffraction angle $2\theta\chi$ (degree)), the diffraction peak of the (114) plane is a peak at which the $2\theta\chi$ is detected at 33 to 36 degrees, and the diffraction peak of the (110) plane is a peak at which the $2\theta\chi$ is detected at 29 to 32 degrees.

Among the diffraction plane, the (114) plane having a hexagonal ferrite crystal structure is positioned close to particles (hexagonal ferrite particles) of the ferromagnetic hexagonal ferrite powder in an easy-magnetization axial direction (c axis direction). In addition the (110) plane having a hexagonal ferrite crystal structure is positioned in a direction orthogonal to the easy-magnetization axial direction.

The inventors have surmised that, in the X-ray diffraction spectra obtained by the In-Plane XRD, as the intensity ratio (Int(110)/Int(114); XRD intensity ratio) of the peak intensity Int(110) of the diffraction peak of a (110) plane with respect to the peak intensity Int(114) of the diffraction peak of the (114) plane of a hexagonal ferrite crystal structure increases, a large number of the former particles present in a state where a direction orthogonal to the easy-magnetization axial direction is closer to a parallel state with respect to the surface of the magnetic layer is present in the magnetic layer, and as the XRD intensity ratio decreases, a small amount of the former particles present in such a state is present in the magnetic layer. It is thought that a state where the XRD intensity ratio is 0.5 to 4.0 means a state where the former particles are suitably aligned in the magnetic layer. The inventors have surmised that this contributes to the prevention of occurrence of a magnetic strain in the magnetic layer which is considered as a reason of a shift of the edge shape of the servo pattern from the ideal shape. As described above, it is thought that, the prevention of a shift of the edge shape of the servo pattern from the ideal shape relates to improvement of head positioning accuracy of the timing-based servo system.

The XRD intensity ratio is preferably equal to or smaller than 3.5 and more preferably equal to or smaller than 3.0, from a viewpoint of further improving the head positioning accuracy of the timing-based servo system. From the same viewpoint, the XRD intensity ratio is preferably equal to or greater than 0.7 and more preferably equal to or greater than 1.0. The XRD intensity ratio can be, for example, controlled in accordance with process conditions of an alignment process performed in a manufacturing step of the magnetic tape. As the alignment process, the homeotropic alignment process is preferably performed. The homeotropic alignment process can be preferably performed by applying a magnetic field vertically to the surface of a coating layer of a magnetic layer forming composition in a wet state (undried state). As the alignment conditions are reinforced, the value of the XRD intensity ratio tends to increase. As the process conditions of the alignment process, magnetic field strength of the alignment process is used. The process conditions of the alignment process are not particularly limited. The process conditions of the alignment process may be set so as that the XRD intensity ratio of 0.5 to 4.0 can be realized. As an example, the magnetic field strength of the homeotropic alignment process can be 0.10 to 0.80 T or 0.10 to 0.60 T. As dispersibility of the ferromagnetic hexagonal ferrite powder in the magnetic layer forming composition increases, the value of the XRD intensity ratio tends to increase by the homeotropic alignment process.

Vertical Direction Squareness Ratio

The vertical direction squareness ratio is a squareness ratio measured regarding a magnetic tape in a vertical direction. The "vertical direction" described regarding the squareness ratio is a direction orthogonal to the surface of the magnetic layer. That is, regarding the magnetic tape, the vertical direction is a direction orthogonal to a longitudinal direction of the magnetic tape. The vertical direction squareness ratio is measured by using an oscillation sample type magnetic-flux meter. Specifically, the vertical direction squareness ratio of the invention and the specification is a value obtained by sweeping an external magnetic field in the magnetic tape at a measurement temperature of 23° C.±1° C. in the oscillation sample type magnetic-flux meter, under conditions of a maximum external magnetic field of 1194 kA/m (15 kOe) and a scan speed of 4.8 kA/m/sec (60 Oe/sec), and is a value after diamagnetic field correction. The measurement value is obtained as a value obtained by subtracting magnetization of a sample probe of the oscillation sample type magnetic-flux meter as background noise.

The vertical direction squareness ratio of the magnetic tape is equal to or greater than 0.65. The inventors have surmised that the vertical direction squareness ratio of the magnetic tape is an index for the presence amount of the latter particles (fine particles) described above. It is thought that, in the magnetic layer in which the vertical direction squareness ratio of the magnetic tape is equal to or greater than 0.65, the presence amount of such fine particles is small. The inventors have surmised that this contributes to the prevention of occurrence of a magnetic strain in the magnetic layer which is considered as a reason of a shift of the edge shape of the servo pattern from the ideal shape. As described above, it is thought that, the prevention of a shift of the edge shape of the servo pattern from the ideal shape relates to improvement of head positioning accuracy of the timing-based servo system.

From a viewpoint of further improving the head positioning accuracy of the timing-based servo system, the vertical direction squareness ratio is preferably equal to or greater than 0.68, more preferably equal to or greater than 0.70, even more preferably equal to or greater than 0.73, and still more preferably equal to or greater than 0.75. In addition, in principle, a maximum value of the squareness ratio is 1.00. Accordingly, the vertical direction squareness ratio of the magnetic tape is equal to or smaller than 1.00. The vertical direction squareness ratio may be, for example, equal to or smaller than 0.95, equal to or smaller than 0.90, equal to or smaller than 0.87, or equal to or smaller than 0.85. It is thought that, a great value of the vertical direction squareness ratio is preferable, from a viewpoint of decreasing the amount of the latter particles (fine particles) in the magnetic layer and further improving the head positioning accuracy of the timing-based servo system. Therefore, the vertical direction squareness ratio may be greater than the value exemplified above.

The inventors have considered that, in order to set the vertical direction squareness ratio to be equal to or greater than 0.65, it is preferable to prevent occurrence of fine particles due to partial chipping of the particles in a preparation step of the magnetic layer forming composition. A specific method for preventing the occurrence of chipping will be described later.

Next, the magnetic layer and the like included in the magnetic tape will be described more specifically.

Magnetic Layer

Ferromagnetic Powder

The magnetic layer of the magnetic tape includes ferromagnetic hexagonal ferrite powder as ferromagnetic powder.

Regarding the ferromagnetic hexagonal ferrite powder, a magnetoplumbite type (also referred to as an "M type"), a W type, a Y type, and a Z type are known as the crystal structure of the hexagonal ferrite. The ferromagnetic hexagonal ferrite powder included in the magnetic layer may have any crystal structure. In addition, an iron atom and a divalent metal atom are included in the crystal structure of the hexagonal ferrite, as constituent atoms. The divalent metal atom is a metal atom which may become divalent cations as ions, and examples thereof include a barium atom, a strontium atom, an alkaline earth metal atom such as calcium atom, and a lead atom. For example, the hexagonal ferrite including a barium atom as the divalent metal atom is a barium ferrite, and the hexagonal ferrite including a strontium atom is a strontium ferrite. In addition, the hexagonal ferrite may be a mixed crystal of two or more hexagonal ferrites. As an example of the mixed crystal, a mixed crystal of the barium ferrite and the strontium ferrite can be used.

The shape of the particle configuring the ferromagnetic hexagonal ferrite powder is specified by imaging the ferromagnetic hexagonal ferrite powder at a magnification ratio of 100,000 with a transmission electron microscope, and tracing an outline of a particle (primary particle) with a digitizer on a particle image obtained by printing the image on printing paper so that the total magnification of 500,000. The primary particle is an independent particle which is not aggregated. The imaging with a transmission electron microscope is performed by a direct method with a transmission electron microscope at an acceleration voltage of 300 kV. The transmission electron microscope observation and measurement can be, for example, performed with a transmission electron microscope H-9000 manufactured by Hitachi, Ltd. and image analysis software KS-400 manufactured by Carl Zeiss. Regarding the shape of the particle configuring the ferromagnetic hexagonal ferrite powder, a "planar shape" is a shape having two plate surfaces facing each other. Meanwhile, among the shapes of the particles not having such a plate surface, a shape having distinguished long axis and short axis is an "elliptical shape". The long axis is determined as an axis (linear line) having the longest length of the particle. In contrast, the short axis is determined as an axis having the longest length of the particle in a linear line orthogonal to the long axis. A shape not having distinguished long axis and short axis, that is, a shape in which the length of the long axis is the same as the length of the short axis is a "sphere shape". From the shapes, a shape in which the long axis and the short axis are hardly specified, is called an undefined shape. The imaging with a transmission electron microscope for specifying the shapes of the particles is performed without performing the alignment process with respect to the imaging target powder. The shape of the raw material powder used for the preparation of the magnetic layer forming composition and the ferromagnetic hexagonal ferrite powder included in the magnetic layer may be any one of the planar shape, the elliptical shape, the sphere shape, and the undefined shape.

An average particle size of various powders disclosed in the invention and the specification is an arithmetical mean of the values obtained regarding randomly extracted 500 particles by using the particle image which is captured as described above. The average particle size shown in the examples which will be described later is a value obtained by using transmission electron microscope H-9000 manufactured by Hitachi, Ltd. as the transmission electron microscope and image analysis software KS-400 manufactured by Carl Zeiss as the image analysis software.

For details of the ferromagnetic hexagonal ferrite powder, descriptions disclosed in paragraphs 0134 to 0136 of JP2011-216149A can be referred to, for example.

The content (filling percentage) of the ferromagnetic hexagonal ferrite powder of the magnetic layer is preferably 50% to 90% by mass and more preferably 60% to 90% by mass. The component other than the ferromagnetic hexagonal ferrite powder of the magnetic layer is at least a binding agent, and one or more kinds of additives can be randomly included. A high filling percentage of the ferromagnetic hexagonal ferrite powder of the magnetic layer is preferable, from a viewpoint of improving recording density.

Binding Agent

The magnetic tape is a coating type magnetic tape, and the magnetic layer includes a binding agent together with the ferromagnetic powder. As the binding agent, one or more kinds of resin is used. The resin may be a homopolymer or a copolymer. As the binding agent, various resins normally used as a binding agent of the coating type magnetic recording medium can be used. For example, as the binding agent, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, and a polyvinylalkylal resin such as polyvinyl acetal or polyvinyl butyral can be used alone or a plurality of resins can be mixed with each other to be used. Among these, a polyurethane resin, an acrylic resin, a cellulose resin, and a vinyl chloride resin are preferable. These resins can be used as the binding agent even in the non-magnetic layer and/or a back coating layer which will be described later. For the binding agent described above, description disclosed in paragraphs 0028 to 0031 of JP2010-24113A can be referred to. An average molecular weight of the resin used as the binding agent can be, for example, 10,000 to 200,000 as a weight-average molecular weight. The weight-average molecular weight of the invention and the specification is a value obtained by performing polystyrene conversion of a value measured by gel permeation chromatography (GPC). As the measurement conditions, the following conditions can be used. The weight-average molecular weight shown in examples which will be described later is a value obtained by performing polystyrene conversion of a value measured under the following measurement conditions.

GPC device: HLC-8120 (manufactured by Tosoh Corporation)

Column: TSK gel Multipore HXL-M (manufactured by Tosoh Corporation, 7.8 mmID (inner diameter)×30.0 cm)

Eluent: Tetrahydrofuran (THF)

In addition, a curing agent can also be used together with the binding agent. As the curing agent, in one aspect, a thermosetting compound which is a compound in which a curing reaction (crosslinking reaction) proceeds due to heating can be used, and in another aspect, a photocurable compound in which a curing reaction (crosslinking reaction) proceeds due to light irradiation can be used. At least a part of the curing agent is included in the magnetic layer in a state of being reacted (crosslinked) with other components such as the binding agent, by proceeding the curing reaction in the magnetic layer forming step. The preferred curing agent is a thermosetting compound, polyisocyanate is suitable. For details of the polyisocyanate, descriptions disclosed in paragraphs 0124 and 0125 of JP2011-216149A can be referred to, for example. The amount of the curing agent can be, for example, 0 to 80.0 parts by mass with respect to 100.0 parts by mass of the binding agent in the magnetic layer forming composition, and is preferably 50.0 to 80.0 parts by mass, from a viewpoint of improvement of hardness of each layer such as the magnetic layer.

Additives

The magnetic layer includes ferromagnetic powder and a binding agent, and may include one or more kinds of additives, if necessary. As the additives, the curing agent described above are used as an example. In addition, examples of the additive which can be included in the magnetic layer include a non-magnetic filler, a lubricant, a dispersing agent, a dispersing assistant, an antibacterial agent, an antistatic agent, an antioxidant, and carbon black. The non-magnetic filler is identical to the non-magnetic powder. As the non-magnetic filler, a non-magnetic filler (hereinafter, referred to as a "projection formation agent") which can function as a projection formation agent which forms projections suitably protruded from the surface of the magnetic layer, and a non-magnetic filler (hereinafter, referred to as an "abrasive") which can function as an abrasive can be used. The magnetic layer of the magnetic tape preferably includes at least one of the projection formation agent and the abrasive and more preferably include both of them.

In addition, as the dispersing agent which is an example of the additive, a well-known dispersing agent such as a carboxy group-containing compound or a nitrogen-containing compound can be used. For example, the nitrogen-containing compound may be any of a primary amine represented by $NH_2R$, a secondary amine represented by $NHR_2$, and a tertiary amine represented by $NR_3$. In the above description, R represents a random structure configuring the nitrogen-containing compound, and a plurality of Rs may be the same as each other or different from each other. The nitrogen-containing compound may be a compound (polymer) having a plurality of repeating structure in a molecule. The inventors have thought that a nitrogen-containing part of the nitrogen-containing compound which functions as an adsorption part to the surface of the particle of the ferromagnetic hexagonal ferrite powder is a reason why the nitrogen-containing compound can function as the dispersing agent. As the carboxy group-containing compound, fatty acid such as oleic acid can be used, for example. The inventors have thought that a carboxy group which functions as an adsorption part to the surface of the particle of the ferromagnetic powder is a reason why the carboxy group-containing compound can function as the dispersing agent. It is also preferable to use the carboxy group-containing compound and the nitrogen-containing compound in combination.

As the additives, a commercially available product or an additive prepared by a well-known method can be suitably used according to desired properties.

Non-Magnetic Layer

Next, the non-magnetic layer will be described. The magnetic tape may directly include a magnetic layer on a non-magnetic support, or may include a non-magnetic layer including non-magnetic powder and a binding agent between the non-magnetic support and the magnetic layer. The non-magnetic powder used in the non-magnetic layer may be powder of inorganic substances (inorganic powder) or powder of organic substances. In addition, carbon black and the like can be used. Examples of the inorganic substance include metal, metal oxide, metal carbonate, metal sulfate, metal nitride, metal carbide, and metal sulfide. These non-magnetic powders can be purchased as a commercially available product or can be manufactured by a well-known method. For details thereof, descriptions disclosed in paragraphs 0146 to 0150 of JP2011-216149A can be referred to. For carbon black which can be used in the non-magnetic layer, descriptions disclosed in paragraphs 0040 and 0041 of JP2010-24113A can be referred to. The content (filling percentage) of the non-magnetic powder of the non-magnetic layer is preferably 50% to 90% by mass and more preferably 60% to 90% by mass.

In regards to other details of a binding agent or additives of the non-magnetic layer, the well-known technology regarding the non-magnetic layer can be applied. In addition, in regards to the type and the content of the binding agent, and the type and the content of the additive, for example, the well-known technology regarding the magnetic layer can be applied.

The non-magnetic layer of the invention and the specification also includes a substantially non-magnetic layer including a small amount of ferromagnetic powder as impurities or intentionally, together with the non-magnetic powder. Here, the substantially non-magnetic layer is a layer having a residual magnetic flux density equal to or smaller than 10 mT, a layer having coercivity equal to or smaller than 7.96 kA/m (100 Oe), or a layer having a residual magnetic flux density equal to or smaller than 10 mT and coercivity equal to or smaller than 7.96 kA/m (100 Oe). It is preferable that the non-magnetic layer does not have a residual magnetic flux density and coercivity.

Back Coating Layer

The magnetic tape can also include a back coating layer including non-magnetic powder and a binding agent on a surface side of the non-magnetic support opposite to the surface side including the magnetic layer. The back coating layer preferably includes any one or both of carbon black and inorganic powder. In regards to the binding agent included in the back coating layer and various additives which can be randomly included in the back coating layer, a well-known technology regarding the treatment of the magnetic layer and/or the non-magnetic layer can be applied.

Non-Magnetic Support

Next, the non-magnetic support (hereinafter, also simply referred to as a "support") will be described. As the non-magnetic support, well-known components such as polyethylene terephthalate, polyethylene naphthalate, polyamide, polyamide imide, aromatic polyamide subjected to biaxial stretching are used. Among these, polyethylene terephthalate, polyethylene naphthalate, and polyamide are preferable. Corona discharge, plasma treatment, easy-bonding treatment, or thermal treatment may be performed with respect to these supports in advance.

Thickness of Non-Magnetic Support and Each Layer

The thickness of the non-magnetic support is preferably 3.0 to 20.0 µm, more preferably 3.0 to 10.0 µm, and even more preferably 3.0 to 6.0 µm.

The thickness of the magnetic layer is preferably equal to or smaller than 100 nm, from a viewpoint of realizing recording at high density which is recently required. The thickness of the magnetic layer is more preferably 10 nm to 100 nm and even more preferably 20 to 90 nm. The magnetic layer may be at least single layer, the magnetic layer may be separated into two or more layers having different magnetic properties, and a configuration of a well-known multilayered magnetic layer can be applied. A thickness of the magnetic layer in a case where the magnetic layer is separated into two or more layers is the total thickness of the layers.

The thickness of the non-magnetic layer is, for example, 0.1 to 1.5 µm and preferably 0.1 to 1.0 µm.

A thickness of the back coating layer is preferably equal to or smaller than 0.9 µm and more preferably 0.1 to 0.7 µm.

The thicknesses of various layers of the magnetic tape and the non-magnetic support can be acquired by a well-known film thickness measurement method. As an example, a cross section of the magnetic tape in a thickness direction is, for example, exposed by a well-known method of ion beams or microtome, and the exposed cross section is observed with a scan electron microscope. In the cross section observation, various thicknesses can be acquired as a thickness acquired at one portion of the cross section in the thickness direction, or an arithmetical mean of thicknesses acquired at a plurality of portions of two or more portions, for example, two portions which are randomly extracted. In addition, the thickness of each layer may be acquired as a designed thickness calculated according to the manufacturing conditions.

Manufacturing Method

Manufacturing of Magnetic Tape in which Servo Pattern is Formed

Preparation of Each Layer Forming Composition

Each composition for forming the magnetic layer, the non-magnetic layer, or the back coating layer normally includes a solvent, together with various components described above. As the solvent, various organic solvents generally used for manufacturing a coating type magnetic recording medium can be used. Among those, from a viewpoint of solubility of the binding agent normally used in the coating type magnetic recording medium, each layer forming composition preferably includes one or more ketone solvents such as acetone, methyl ethyl ketone, methyl isobutyl ketone, diisobutyl ketone, cyclohexanone, isophorone, and tetrahydrofuran. The amount of the solvent in each layer forming composition is not particularly limited, and can be set to be the same as that of each layer forming composition of a typical coating type magnetic recording medium. In addition, steps of preparing each layer forming composition generally include at least a kneading step, a dispersing step, and a mixing step provided before and after these steps, if necessary. Each step may be divided into two or more stages. All of raw materials used in the invention may be added at an initial stage or in a middle stage of each step. In addition, each raw material may be separately added in two or more steps. For example, a binding agent may be separately added in a kneading step, a dispersing step, and a mixing step for adjusting viscosity after the dispersion. In order to manufacture the magnetic tape, a well-known manufacturing technology of the related art can be used in various steps. In the kneading step, an open kneader, a continuous kneader, a pressure kneader, or a kneader having a strong kneading force such as an extruder is preferably used. The details of the kneading processes of these kneaders are disclosed in JP1989-106338A (JP-H01-106338A) and JP1989-79274A (JP-H01-79274A). As a dispersing machine, a well-known dispersing machine can be used. Each layer forming composition may be filtered by a well-known method before performing the coating step. The filtering can be performed by using a filter, for example. As the filter used in the filtering, a filter having a hole diameter of 0.01 to 3 µm (for example, filter made of glass fiber or filter made of polypropylene) can be used, for example.

Regarding the dispersion process of the magnetic layer forming composition, it is preferable to prevent the occurrence of chipping as described above. In order to realize the prevention, it is preferable to perform the dispersion process of the ferromagnetic hexagonal ferrite powder by a dispersion process having two stages, in which a coarse aggregate of the ferromagnetic hexagonal ferrite powder is crushed by the dispersion process in a first stage, and the dispersion process in a second stage, in which a collision energy applied to particles of the ferromagnetic hexagonal ferrite powder due to collision with the dispersion beads is smaller than that in the first dispersion process, is performed, in the step of preparing the magnetic layer forming composition. According to such a dispersion process, it is possible to improve dispersibility of the ferromagnetic hexagonal ferrite powder and prevent the occurrence of chipping.

As a preferred aspect of the dispersion process having two stages, a dispersion process including a first stage of obtaining a dispersion liquid by performing the dispersion process of the ferromagnetic hexagonal ferrite powder, the binding agent, and the solvent under the presence of first dispersion beads, and a second stage of performing the dispersion process of the dispersion liquid obtained in the first stage under the presence of second dispersion beads having smaller bead diameter and density than those of the first dispersion beads can be used. Hereinafter, the dispersion process of the preferred aspect described above will be further described.

In order to increase the dispersibility of the ferromagnetic hexagonal ferrite powder, the first stage and the second stage are preferably performed as the dispersion process before mixing the ferromagnetic hexagonal ferrite powder and other powder components. For example, in a case of forming the magnetic layer including the non-magnetic filler, the first stage and the second stage are preferably performed as a dispersion process of a solution (magnetic liquid) including ferromagnetic hexagonal ferrite powder, a binding agent, a solvent, and randomly added additives, before mixing the non-magnetic filler.

A bead diameter of the second dispersion bead is preferably equal to or smaller than 1/100 and more preferably equal to or smaller than 1/500 of a bead diameter of the first dispersion bead. The bead diameter of the second dispersion bead can be, for example, equal to or greater than 1/10,000 of the bead diameter of the first dispersion bead. However, there is no limitation to this range. The bead diameter of the second dispersion bead is, for example, preferably 80 to 1,000 nm. Meanwhile, the bead diameter of the first dispersion bead can be, for example, 0.2 to 1.0 mm.

The bead diameter of the invention and the specification is a value measured by the same method as the measurement method of the average particle size of the powder described above.

The second stage is preferably performed under the conditions in which the amount of the second dispersion beads is equal to or greater than 10 times of the amount of the ferromagnetic hexagonal ferrite powder, and is more preferably performed under the conditions in which the amount of the second dispersion beads is 10 times to 30 times of the amount of the ferromagnetic hexagonal ferrite powder, based on mass.

Meanwhile, the amount of the dispersion beads in the first stage is preferably in the range described above.

The second dispersion beads are beads having lower density than that of the first dispersion beads. The "density" is obtained by dividing the mass (unit: g) of the dispersion beads by volume (unit: $cm^3$). The measurement is performed by the Archimedes method. The density of the second dispersion beads is preferably equal to or lower than 3.7 $g/cm^3$ and more preferably equal to or lower than 3.5 $g/cm^3$. The density of the second dispersion beads may be, for example, equal to or higher than 2.0 $g/cm^3$ or may be lower than 2.0 $g/cm^3$. As the preferred second dispersion beads from a viewpoint of density, diamond beads, silicon carbide beads, or silicon nitride beads can be used, and as preferred second dispersion beads from a viewpoint of density and hardness, diamond beads can be used.

Meanwhile, as the first dispersion beads, dispersion beads having density exceeding 3.7 $g/cm^3$ are preferable, dispersion beads having density equal to or higher than 3.8 $g/cm^3$ are more preferable, and dispersion beads having density equal to or higher than 4.0 $g/cm^3$ are even more preferable. The density of the first dispersion beads may be, for example, equal to or smaller than 7.0 $g/cm^3$ or may exceed 7.0 $g/cm^3$. As the first dispersion beads, zirconia beads or alumina beads are preferably used, and zirconia beads are more preferably used.

The dispersion time is not particularly limited and may be set in accordance with the kind of a dispersing machine used.

Coating Step

The magnetic layer can be formed by directly applying the magnetic layer forming composition onto the surface of the non-magnetic support or performing multilayer coating of the magnetic layer forming composition with the non-magnetic layer forming composition in order or at the same time. The back coating layer can be formed by applying the back coating layer forming composition to the surface side of the non-magnetic support opposite to a surface side provided with the magnetic layer (or to be provided with the magnetic layer). For details of the coating for forming each layer, a description disclosed in a paragraph 0066 of JP2010-231843A can be referred to.

Other Steps

For details of various other steps for manufacturing the magnetic tape, descriptions disclosed in paragraphs 0067 to 0070 of JP2010-231843A can be referred to. It is preferable that the coating layer of the magnetic layer forming composition is subjected to an alignment process, while the coating layer is wet (not dried). For the alignment process, various well-known technologies such as a description disclosed in a paragraph 0067 of JP2010-231843A can be used without any limitation. As described above, it is preferable to perform the homeotropic alignment process as the alignment process, from a viewpoint of controlling the XRD intensity ratio. Regarding the alignment process, the above description can also be referred to.

As described above, it is possible to obtain a magnetic tape included in the magnetic tape device according to one aspect of the invention. However, the manufacturing method described above is merely an example, the XRD intensity ratio and the vertical direction squareness ratio can be controlled to be in respective ranges described above by a random method capable of adjusting the XRD intensity ratio and the vertical direction squareness ratio, and such an aspect is also included in the invention.

Formation of Servo Pattern

Figure 2:
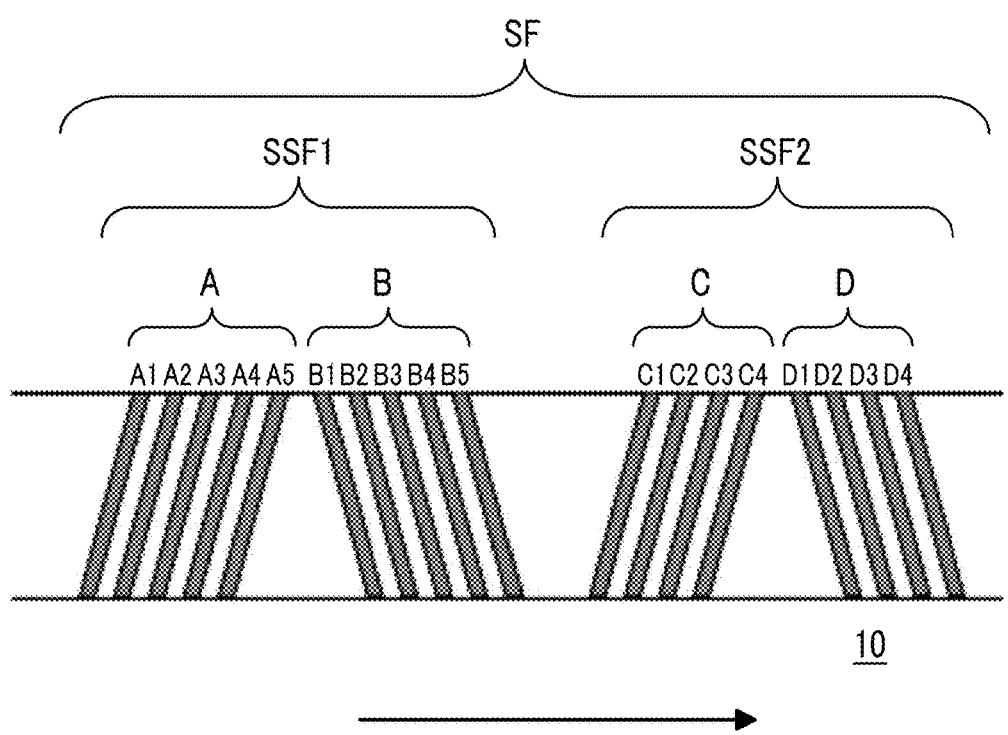
FIG. 2 shows a servo pattern disposition example of an LTO Ultrium format tape.
Figure 3:
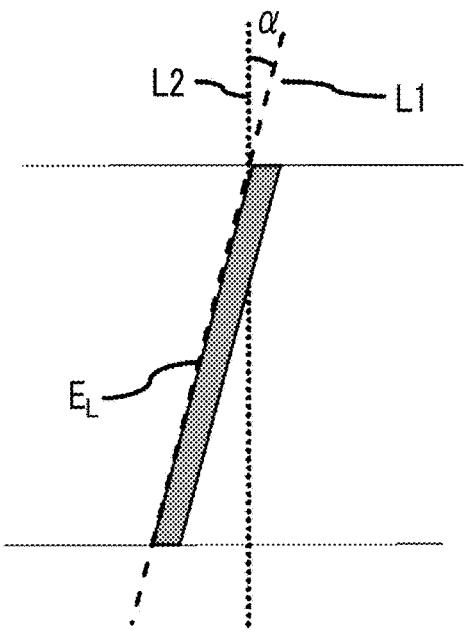
FIG. 3 is an explanatory diagram of an angle α regarding an edge shape of a servo pattern.
Figure 4:
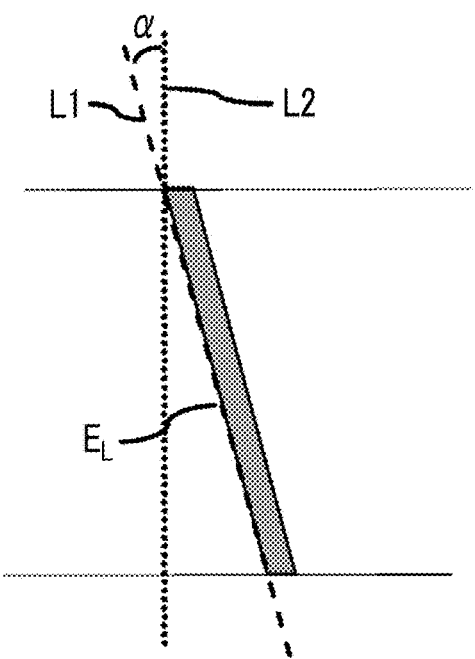
FIG. 4 is another explanatory diagram of an angle α regarding an edge shape of a servo pattern.
Figure 5:
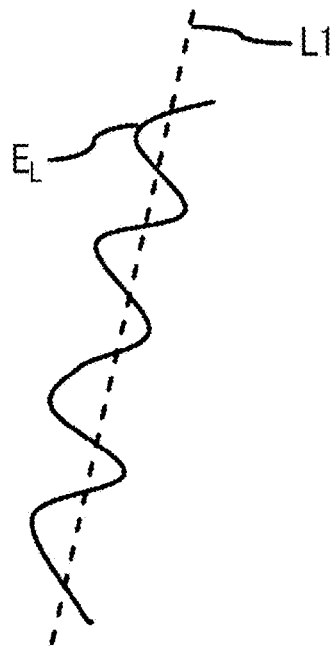
FIG. 5 shows an example of an edge shape of a servo pattern.
Figure 6:
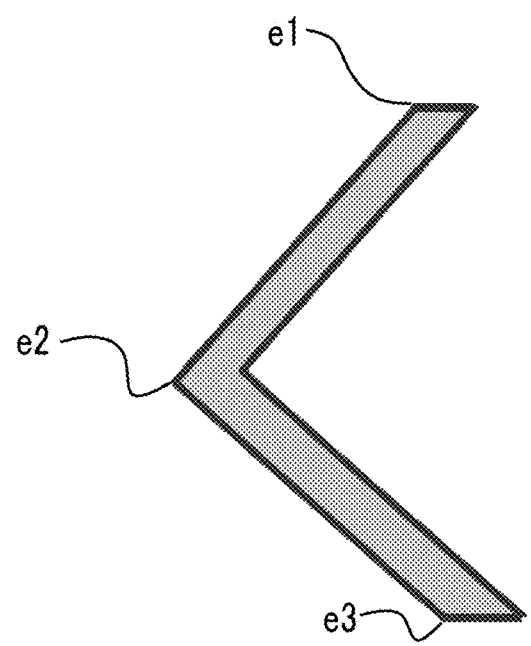
FIG. 6 shows an example of a servo pattern.
Figure 7:
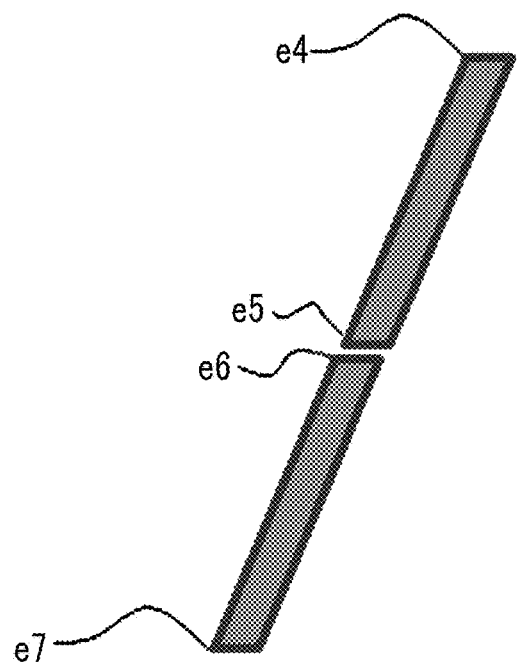
FIG. 7 shows another example of a servo pattern.
Figure 8:
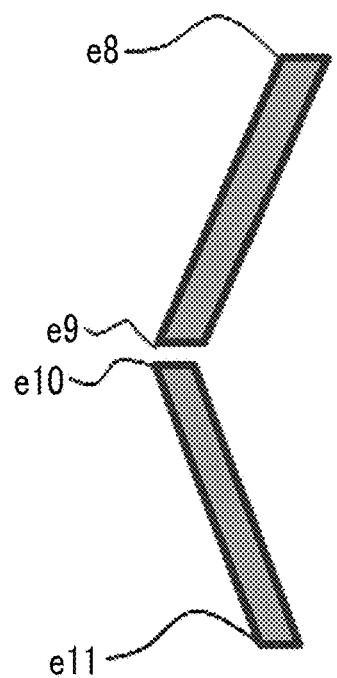
FIG. 8 shows still another example of a servo pattern.

The magnetic tape includes a timing-based servo pattern in the magnetic layer. FIG. 1 shows a disposition example of a region (servo band) in which the timing-based servo pattern is formed and a region (data band) interposed between two servo bands. FIG. 2 shows a disposition example of the timing-based servo patterns. FIGS. 2 to 4 and FIGS. 6 to 8 show specific examples of the shape of the timing-based servo pattern. Here, the disposition example and/or the shape shown in each drawing is merely an example, and the servo pattern, the servo bands, and the data bands may be formed and disposed with the shape and in the disposition according to a system of the magnetic tape device (drive). In addition, for the shape and the disposition of the timing-based servo pattern, a well-known technology such as disposition examples shown in FIG. 4, FIG. 5, FIG. 6, FIG. 9, FIG. 17, and FIG. 20 of U.S. Pat. No. 5,689,384A can be applied without any limitation, for example.

The servo pattern can be formed by magnetizing a specific region of the magnetic layer by a servo write head mounted on a servo writer. A region to be magnetized by the servo write head (position where the servo pattern is formed) is determined by standards. As the servo writer, a commercially available servo writer or a servo writer having a well-known configuration can be used. For the configuration of the servo writer, well-known technologies such as technologies disclosed in JP2011-175687A, U.S. Pat. No. 5,689,384A, and U.S. Pat. No. 6,542,325B can be referred to.

The magnetic tape is generally accommodated in a magnetic tape cartridge and the magnetic tape cartridge is mounted in the magnetic tape device. In the magnetic tape cartridge, the magnetic tape is generally accommodated in a cartridge main body in a state of being wound around a reel. The reel is rotatably provided in the cartridge main body. As the magnetic tape cartridge, a single reel type magnetic tape cartridge including one reel in a cartridge main body and a twin reel type magnetic tape cartridge including two reels in a cartridge main body are widely used. In a case where the single reel type magnetic tape cartridge is mounted in the magnetic tape device (drive) in order to record and/or reproduce information (magnetic signals) to the magnetic tape, the magnetic tape is drawn from the magnetic tape cartridge and wound around the reel on the drive side. A magnetic head is disposed on a magnetic tape transportation path from the magnetic tape cartridge to a winding reel. Sending and winding of the magnetic tape are performed between a reel (supply reel) on the magnetic tape cartridge side and a reel (winding reel) on the drive side. In the meantime, the magnetic head comes into contact with and slides on the surface of the magnetic layer of the magnetic tape, and accordingly, the recording and/or reproduction of the magnetic signal is performed. With respect to this, in the twin reel type magnetic tape cartridge, both reels of the supply reel and the winding reel are provided in the magnetic tape cartridge. The magnetic tape according to one aspect of the invention may be accommodated in any of single reel type magnetic tape cartridge and twin reel type magnetic tape cartridge. The configuration of the magnetic tape cartridge is well known.

The magnetic tape described above includes the magnetic layer including ferromagnetic hexagonal ferrite powder having an activation volume equal to or smaller than 1,600 nm$^3$ and is capable of improving the head positioning accuracy of the timing-based servo system.

Magnetic Tape Device

One aspect of the invention relates to a magnetic tape device including the magnetic tape, a magnetic head, and a servo head.

The details of the magnetic tape mounted on the magnetic tape device are as described above. Such a magnetic tape includes timing-based servo patterns. Accordingly, a magnetic signal is recorded on the data band by the magnetic head to form a data track, and/or, in a case of reproducing the recorded signal, a head tracking of a timing-based servo type is performed based on the read servo pattern, while reading the servo pattern by the servo head, and therefore, it is possible to cause the magnetic head to follow the data track at a high accuracy. As an index of the head positioning accuracy, a position error signal (PES) obtained by a method shown in examples which will be described later can be used. The PES is an index for the running of the magnetic head while being shifted from a position to run, even in a case where head tracking is performed by a servo system, in a case where the magnetic tape runs in the magnetic tape device, and a great value thereof means a great shift and a low head positioning accuracy of the servo system. The magnetic tape according to one aspect of the invention can achieve, for example, the PES equal to or smaller than 9.0 nm (for example, 7.0 to 9.0 μm).

As the magnetic head mounted on the magnetic tape device, a well-known magnetic head which can perform the recording and/or reproducing of the magnetic signal with respect to the magnetic tape can be used. A recording head and a reproduction head may be one magnetic head or may be separated magnetic heads. As the servo head, a well-known servo head which can read the timing-based servo pattern of the magnetic tape can be used. At least one or two or more servo heads may be included in the magnetic tape device. In addition, a servo pattern reading element may be included in a magnetic head including an element for recording a magnetic signal and/or an element for the reproducing. That is, the magnetic head and the servo head may be a single head.

For details of the head tracking of the timing-based servo system, for example, well-known technologies such as technologies disclosed in U.S. Pat. No. 5,689,384A, U.S. Pat. No. 6,542,325B, and U.S. Pat. No. 7,876,521B can be used without any limitation.

A commercially available magnetic tape device generally includes a magnetic head and a servo head in accordance to a standard. In addition, a commercially available magnetic tape device generally has a servo controlling mechanism for realizing head tracking of the timing-based servo system in accordance to a standard. The magnetic tape device according to one aspect of the invention can be configured by incorporating the magnetic tape according to one aspect of the invention to a commercially available magnetic tape device.

EXAMPLES

Hereinafter, the invention will be described with reference to examples. However, the invention is not limited to aspects shown in the examples. "Parts" and "%" in the following description mean "parts by mass" and "% by mass", unless otherwise noted. In addition, steps and evaluations described below are performed in an environment of an atmosphere temperature of 23° C.±1° C., unless otherwise noted.

1. Manufacturing of Magnetic Tape

Example 1

A list of each layer forming composition is shown below.
List of Magnetic Layer Forming Composition
Magnetic Liquid
Plate-shaped ferromagnetic hexagonal ferrite powder (M-type barium ferrite): 100.0 parts
(Activation volume: see Table 1)
Oleic acid: 2.0 parts
A vinyl chloride copolymer (MR-104 manufactured by Zeon Corporation): 10.0 parts
SO$_3$Na group-containing polyurethane resin: 4.0 parts
(Weight-average molecular weight: 70,000, SO$_3$Na group: 0.07 meq/g)
An amine-based polymer (DISPERBYK-102 manufactured by BYK Additives & Instruments): 6.0 parts
Methyl ethyl ketone: 150.0 parts
Cyclohexanone: 150.0 parts
Abrasive Solution
α-alumina: 6.0 parts
(Brunauer-Emmett-Teller (BET) specific surface area: 19 m$^2$/g, Mohs hardness: 9)
SO$_3$Na group-containing polyurethane resin: 0.6 parts
(Weight-average molecular weight: 70,000, SO$_3$Na group: 0.1 meq/g)
2,3-Dihydroxynaphthalene: 0.6 parts
Cyclohexanone: 23.0 parts
Projection Forming Agent Liquid
Colloidal silica: 2.0 parts
(Average particle size: 80 nm)
Methyl ethyl ketone: 8.0 parts
Lubricant and Curing Agent Liquid
Stearic acid: 3.0 parts
Stearic acid amide: 0.3 parts
Butyl stearate: 6.0 parts
Methyl ethyl ketone: 110.0 parts
Cyclohexanone: 110.0 parts
Polyisocyanate (CORONATE (registered trademark) L manufactured by Tosoh Corporation): 3.0 parts
List of Non-Magnetic Layer Forming Composition
Non-magnetic inorganic powder: α-iron oxide: 100.0 parts
(Average particle size: 10 nm, BET specific surface area: 75 m$^2$/g)
Carbon black: 25.0 parts
(Average particle size: 20 nm)
A SO$_3$Na group-containing polyurethane resin: 18.0 parts (Weight-average molecular weight: 70,000, content of SO$_3$Na group: 0.2 meq/g)
Stearic acid: 1.0 parts
Cyclohexanone: 300.0 parts
Methyl ethyl ketone: 300.0 parts
List of Back Coating Layer Forming Composition
Non-magnetic inorganic powder: α-iron oxide: 80.0 parts
(Average particle size: 0.15 µm, BET specific surface area: 52 m$^2$/g)
Carbon black: 20.0 parts
(Average particle size: 20 nm)
A vinyl chloride copolymer: 13.0 parts
A sulfonic acid group-containing polyurethane resin: 6.0 parts
Phenylphosphonic acid: 3.0 parts
Cyclohexanone: 155.0 parts
Methyl ethyl ketone: 155.0 parts
Stearic acid: 3.0 parts
Butyl stearate: 3.0 parts
Polyisocyanate: 5.0 parts
Cyclohexanone: 200.0 parts
Preparation of Magnetic Layer Forming Composition The magnetic layer forming composition was prepared by the following method.

A dispersion liquid A was prepared by dispersing (first stage) various components of the magnetic liquid with a batch type vertical sand mill by using zirconia beads having a bead diameter of 0.5 mm (first dispersion beads, density of 6.0 g/cm$^3$) for 24 hours, and then performing filtering with a filter having a hole diameter of 0.5 µm. The used amount of zirconia beads was 10 times of the amount of the ferromagnetic hexagonal barium ferrite powder based on mass.

After that, a dispersion liquid (dispersion liquid B) was prepared by dispersing (second stage) dispersion liquid A with a batch type vertical sand mill by using diamond beads having a bead diameter shown in Table 1 (second dispersion beads, density of 3.5 g/cm$^3$) for 1 hour, and then separating diamond beads by using a centrifugal separator. The magnetic liquid is the dispersion liquid B obtained as described above. The used amount of diamond beads was 10 times of the amount of the ferromagnetic hexagonal barium ferrite powder based on mass.

Regarding the abrasive solution, various components of the abrasive solution were mixed with each other and put in a transverse beads mill disperser together with zirconia beads having a bead diameter of 0.3 mm, so as to perform the adjustment so that a value of bead volume/(abrasive solution volume+bead volume) was 80%, the beads mill dispersion process was performed for 120 minutes, the liquid after the process was extracted, and an ultrasonic dispersion filtering process was performed by using a flow type ultrasonic dispersion filtering device. By doing so, the abrasive solution was prepared.

The magnetic layer forming composition was prepared by introducing the prepared magnetic liquid, the abrasive solution, and the remaining components in a dissolver, stirring the mixture at a circumferential speed of 10 m/sec for 30 minutes, and performing a process of 3 passes at a flow rate of 7.5 kg/min with a flow type ultrasonic disperser, and filtering the mixture with a filter having a hole diameter of 1 µm.

Preparation of Non-Magnetic Layer Forming Composition

A non-magnetic layer forming composition was prepared by dispersing various components of the non-magnetic layer forming composition with a batch type vertical sand mill by using zirconia beads having a bead diameter of 0.1 mm for 24 hours, and then performing filtering with a filter having a hole diameter of 0.5 µm.

Preparation of Back Coating Layer Forming Composition

Components among various components of the back coating layer forming composition except a lubricant (stearic acid and butyl stearate), polyisocyanate, and 200.0 parts of cyclohexanone were kneaded and diluted by an open kneader, and subjected to a dispersion process of 12 passes, with a transverse beads mill disperser and zirconia beads having a bead diameter of 1 mm, by setting a bead filling percentage as 80 volume %, a circumferential speed of rotor distal end as 10 m/sec, and a retention time for 1 pass as 2 minutes. After that, the remaining components were added and stirred with a dissolver, the obtained dispersion liquid was filtered with a filter having a hole diameter of 1 µm and a back coating layer forming composition was prepared.

Manufacturing Method of Magnetic Tape

The non-magnetic layer forming composition prepared as described above was applied to a surface of a support made of polyethylene naphthalate having a thickness of 5.0 µm so that the thickness after the drying becomes 1.0 µm and was dried to form a non-magnetic layer. The magnetic layer forming composition prepared as described above was applied onto the surface of the formed non-magnetic layer so that the thickness after the drying becomes 70 nm and a coating layer was formed. A homeotropic alignment process was performed by applying a magnetic field having a strength shown in Table 1 in a vertical direction with respect to the surface of the coating layer, while the coating layer of the magnetic layer forming composition is wet (not dried). After that, the coating layer was dried to form a magnetic layer.

After that, the back coating layer forming composition prepared as described above was applied to the surface of the support on a side opposite to the surface where the non-magnetic layer and the magnetic layer are formed, so that the thickness after the drying becomes 0.4 µm, and was dried.

A calender process (surface smoothing treatment) was performed with respect to the magnetic tape obtained as described above by a calender configured of only a metal roll, at a speed of 100 m/min, linear pressure of 300 kg/cm (294 kN/m), and a surface temperature of a calender roll of 90° C., and then, a heat treatment was performed in the environment of the atmosphere temperature of 70° C. for 36 hours. After the heat treatment, the slitting was performed to have a width of ½ inches (0.0127 meters), and a magnetic tape was obtained.

In a state where the magnetic layer of the obtained magnetic tape was demagnetized, servo patterns having disposition and shapes according to the LTO Ultrium format were formed on the magnetic layer by using a servo write head mounted on a servo writer. Accordingly, a magnetic tape of Example 1 including data bands, servo bands, and guide bands in the disposition according to the LTO Ultrium format in the magnetic layer, and including servo patterns having the disposition and the shape according to the LTO Ultrium format on the servo band was obtained.

Examples 2 to 5 and Comparative Examples 1 to 9

A magnetic tape was manufactured in the same manner as in Example 1, except that various items shown in Table 1 were changed as shown in Table 1.

In Table 1, in the comparative examples in which "none" is shown in a column of the dispersion beads and a column of the time, the magnetic layer forming composition was prepared without performing the second stage in the magnetic liquid dispersion process.

In Table 1, in the comparative examples in which "none" is shown in a column of the homeotropic alignment process magnetic field strength, the magnetic layer was formed without performing the alignment process.

Regarding the servo write head used for forming the servo patterns, as the value of leakage magnetic field is great, capacity for recording the servo patterns is high. In Example 1 described above, Examples 2 to 5, and Comparative Examples 1 to 9, a servo write head in which the leakage magnetic field is a value shown in Table 1 was used.

In Examples 1 to 5 and Comparative Examples 4 to 9, ferromagnetic hexagonal ferrite powders which are the same powder lot were used as the ferromagnetic hexagonal ferrite powder used for forming the magnetic layer.

In Comparative Examples 1 to 3, ferromagnetic hexagonal ferrite powder which is a powder lot different from that of the examples and the comparative examples (powder lot having a greater average particle size) was used as the ferromagnetic hexagonal ferrite powder used for forming the magnetic layer.

A part of each magnetic tape of the examples and the comparative examples was cut out and the ferromagnetic hexagonal ferrite powder was collected from the magnetic layer by the method described above as a collecting method of a measurement sample. The measurement for obtaining an activation volume was performed with respect to the collected ferromagnetic hexagonal ferrite powder. The magnetic field sweep rates in the coercivity Hc measurement part at timing points of 3 minutes and 30 minutes were measured by using an oscillation sample type magnetic-flux meter (manufactured by Toei Industry Co., Ltd.), and the activation volume was calculated from the relational expression described above. The measurement was performed in the environment of 23° C.±1° C.

2. Various Evaluations (1) XRD Intensity Ratio

A tape sample was cut out from the manufactured magnetic tape.

Regarding the cut-out tape sample, the surface of the magnetic layer was irradiated with X-ray by using a thin film X-ray diffraction device (Smart Lab manufactured by Rigaku Corporation), and the In-Plane XRD was performed by the method described above.

The peak intensity Int(114) of the diffraction peak of the (114) plane and the peak intensity Int(110) of the diffraction peak of a (110) plane of a hexagonal ferrite crystal structure were obtained from the X-ray diffraction spectra obtained by the In-Plane XRD, and the XRD intensity ratio (Int(110)/Int(114)) was calculated.

(2) Vertical Direction Squareness Ratio

A vertical direction squareness ratio of the manufactured magnetic tape was obtained by the method described above using an oscillation sample type magnetic-flux meter (manufactured by Toei Industry Co., Ltd.).

Measurement and Calculation of Difference ($L_{99.9}-L_{0.1}$)

For each magnetic tape of the examples and the comparative examples, the difference ($L_{99.9}-L_{0.1}$) was obtained by the following method.

Rough measurement was performed in a measurement range of the surface of the magnetic layer of the magnetic tape where the servo pattern is formed, having a size of 90 μm×90 μm, at a pitch of 100 nm, and servo patterns (magnetized region) were extracted by using Dimension 3100 manufactured by Bruker in a frequency modulation mode as a magnetic force microscope, and SSS-MFMR (nominal radius of curvature of 15 nm) manufactured by Nano World AG as a probe. A distance between the surface of the magnetic layer and a distal end of the probe at the time of the magnetic force microscope observation was 20 nm. The measurement range includes five servo patterns of the A burst formed according to LTO Ultrium format, and thus, these five servo patterns were extracted.

Regarding the edge on the downstream side with respect to the running direction of each servo pattern, the measurement was performed with respect to the vicinity of the boundary between the magnetized region and non-magnetized region at a pitch of 5 nm by using the magnetic force microscope and the probe, and a magnetic profile was obtained. The obtained magnetic profile was tilted by an angle α=12°, and accordingly, rotation correction was performed by analysis software so that the angle α=0°.

The measurement was performed at three different portions of the surface of the magnetic layer. Each measurement range included five servo patterns of the A burst.

After that, the difference ($L_{99.9}-L_{0.1}$) was obtained by the method described above by using the analysis software. As the analysis software, MATLAB manufactured by The Math Works, Inc. was used. The difference ($L_{99.9}-L_{0.1}$) obtained as described above was shown in Table 1.

(4) Measurement of PES

Regarding each magnetic tape of the examples and the comparative examples, the servo pattern was read by a verify head on the servo writer used for forming the servo pattern. The verify head is a reading magnetic head that is used for confirming quality of the servo pattern formed on the magnetic tape, and reading elements are disposed at positions corresponding to the positions of the servo pattern (position in the width direction of the magnetic tape), in the same manner as the magnetic head of a well-known magnetic tape device (drive).

A well-known PES arithmetic circuit which calculates the head positioning accuracy of the servo system as the PES from an electric signal obtained by reading the servo pattern by the verify head is connected to the verify head. The PES arithmetic circuit calculates a displacement from the input electric signal (pulse signal) in the width direction of the magnetic tape, as required, and a value obtained by applying a high pass filter (cut-off: 500 cycles/m) with respect to temporal change information (signal) of this displacement was calculated as PES. The calculated PES is shown in Table 1.

The results of the above calculation are shown in Table 1 (Table 1-1 and Table 1-2).

TABLE 1-1

| | Ferromagnetic hexagonal ferrite powder activation volume (nm³) | Dispersion beads Kind | Dispersion beads Bead diameter | Used amount (mass of beads with respect to mass of ferromagnetic hexagonal ferrite powder) | Time | Homeotropic alignment process magnetic field strength | Servo write head Leakage magnetic field (kA/m) | XRD intensity ratio Int(110)/Int(114) | Vertical direction squareness ratio | Servo pattern difference ($L_{99.9} - L_{0.1}$) (nm) | PES (nm) |
|---|---|---|---|---|---|---|---|---|---|---|---|
| | | | | Magnetic liquid dispersion process second stage | | | | | | | |
| Example 1 | 1600 | Diamond | 500 nm | 10 times | 1 h | 0.15T | 247 | 0.5 | 0.70 | 140 | 8.5 |
| Example 2 | 1600 | Diamond | 500 nm | 10 times | 1 h | 0.20T | 247 | 1.5 | 0.75 | 123 | 8.2 |
| Example 3 | 1600 | Diamond | 500 nm | 10 times | 1 h | 0.30T | 247 | 2.3 | 0.80 | 85 | 7.9 |
| Example 4 | 1600 | Diamond | 500 nm | 10 times | 1 h | 0.50T | 247 | 4.0 | 0.85 | 73 | 7.6 |
| Example 5 | 1600 | Diamond | 500 nm | 20 times | 1 h | 0.15T | 247 | 0.7 | 0.83 | 138 | 8.3 |

TABLE 1-2

| | Ferromagnetic hexagonal ferrite powder activation volume (nm³) | Dispersion beads Kind | Dispersion beads Bead diameter | Used amount (mass of beads with respect to mass of ferromagnetic hexagonal ferrite powder) | Time | Homeotropic alignment process magnetic field strength | Servo write head Leakage magnetic field (kA/m) | XRD intensity ratio Int(110)/Int(114) | Vertical direction squareness ratio | Servo pattern difference ($L_{99.9} - L_{0.1}$) (nm) | PES (nm) |
|---|---|---|---|---|---|---|---|---|---|---|---|
| | | | | Magnetic liquid dispersion process second stage | | | | | | | |
| Comparative Example 1 | 2500 | None | None | None | None | None | 247 | 0.2 | 0.63 | 160 | 8.5 |
| Comparative Example 2 | 2000 | None | None | None | None | None | 247 | 0.2 | 0.60 | 163 | 8.5 |
| Comparative Example 3 | 1800 | None | None | None | None | None | 247 | 0.2 | 0.57 | 160 | 8.6 |
| Comparative Example 4 | 1600 | None | None | None | None | None | 247 | 0.2 | 0.55 | 240 | 13.5 |
| Comparative Example 5 | 1600 | None | None | None | None | None | 366 | 0.2 | 0.55 | 230 | 13.3 |
| Comparative Example 6 | 1600 | None | None | None | None | 0.15T | 247 | 3.8 | 0.63 | 205 | 12.2 |
| Comparative Example 7 | 1600 | None | None | None | None | 0.30T | 247 | 5.0 | 0.75 | 227 | 13.1 |
| Comparative Example 8 | 1600 | Diamond | 500 nm | 10 times | 1 h | 1.00T | 247 | 6.1 | 0.90 | 220 | 12.8 |
| Comparative Example 9 | 1600 | Diamond | 500 nm | 10 times | 1 h | None | 247 | 0.3 | 0.66 | 232 | 13.3 |

The PES equal to or smaller than 9.0 nm obtained by the method described above means that it is possible to position a recording head at a high accuracy by head tracking of the timing-based servo system.

With the comparison of Comparative Examples 1 to 3 and Comparative Examples 4 to 9, it is possible to confirm that a phenomenon that the PES is significantly greater than 9.0 nm, that is, a decrease in head positioning accuracy occurs, in the magnetic tape in which the activation volume of the ferromagnetic hexagonal ferrite powder included in the magnetic layer is equal to or smaller than 1,600 nm³ (Comparative Examples 4 to 9). In addition, it is possible to confirm that a decrease in head positioning accuracy is difficult to be prevented by improving recording capacity of the servo write head (see Comparative Example 5).

In addition, with the comparison of Examples 1 to 5 and Comparative Examples 4 to 9, it is possible to confirm that, in Examples 1 to 5, it is possible to set the difference ($L_{99.9}-L_{0.1}$) to be equal to or smaller than 180 nm, by setting the XRD intensity ratio to be 0.5 to 4.0 and the vertical direction squareness ratio to be 0.65 to 1.00. As a result, in the magnetic tapes of Examples 1 to 5, the activation volume of the ferromagnetic hexagonal ferrite powder included in the magnetic layer was equal to or smaller than 1,600 nm³, but the PES equal to or smaller than 9.0 nm was realized. That is, in the magnetic tapes of Examples 1 to 5, it was possible to improve the head positioning accuracy of the timing-based servo system.

The invention is effective in technical fields of magnetic tapes for high-density recording.

What is claimed is:
1. A magnetic tape comprising:
a non-magnetic support; and
a magnetic layer including ferromagnetic powder and a binding agent on the non-magnetic support, wherein the magnetic layer includes a timing-based servo pattern, the ferromagnetic powder is ferromagnetic hexagonal ferrite powder having an activation volume equal to or smaller than 1,600 nm$^3$, an intensity ratio Int(110)/Int(114) of a peak intensity Int(110) of a diffraction peak of a (110) plane with respect to a peak intensity Int(114) of a diffraction peak of a (114) plane of a hexagonal ferrite crystal structure obtained by an X-ray diffraction analysis of the magnetic layer by using an In-Plane method is 0.5 to 4.0, a vertical direction squareness ratio of the magnetic tape is 0.65 to 1.00, and an edge shape of the timing-based servo pattern specified by magnetic force microscope observation is a shape in which a difference ($L_{99.9}-L_{0.1}$) of a value $L_{99.9}$ of a cumulative distribution function of 99.9% of a position shift width from an ideal shape in a longitudinal direction of the magnetic tape and a value $L_{0.1}$ of the cumulative distribution function of 0.1% is equal to or smaller than 180 nm.

2. The magnetic tape according to claim 1,
wherein the timing-based servo pattern is a linear servo pattern which continuously or discontinuously extends from one side to the other side in a width direction of the magnetic tape.

3. The magnetic tape according to claim 2,
wherein the timing-based servo pattern is a linear servo pattern which continuously extends from one side to the other side in the width direction of the magnetic tape and which is tilted with respect to the width direction by an angle of α, and
the ideal shape is a linear shape extending in a direction of the angle α.

4. The magnetic tape according to claim 1,
wherein the vertical direction squareness ratio of the magnetic tape is 0.65 to 0.90.

5. The magnetic tape according to claim 1,
wherein the difference ($L_{99.9}-L_{0.1}$) is equal to or smaller than 150 nm.

6. The magnetic tape according to claim 1,
wherein the activation volume of the ferromagnetic hexagonal ferrite powder is 800 nm$^3$ to 1,600 nm$^3$.

7. The magnetic tape according to claim 1, further comprising:
a non-magnetic layer including non-magnetic powder and a binding agent between the non-magnetic support and the magnetic layer.

8. A magnetic tape device comprising:
a magnetic tape;
a magnetic head; and
a servo head, wherein the magnetic tape is a magnetic tape comprising:
a non-magnetic support; and
a magnetic layer including ferromagnetic powder and a binding agent on the non-magnetic support, wherein the magnetic layer includes a timing-based servo pattern, the ferromagnetic powder is ferromagnetic hexagonal ferrite powder having an activation volume equal to or smaller than 1,600 nm$^3$, an intensity ratio Int(110)/Int(114) of a peak intensity Int(110) of a diffraction peak of a (110) plane with respect to a peak intensity Int(114) of a diffraction peak of a (114) plane of a hexagonal ferrite crystal structure obtained by an X-ray diffraction analysis of the magnetic layer by using an In-Plane method is 0.5 to 4.0, a vertical direction squareness ratio of the magnetic tape is 0.65 to 1.00, and an edge shape of the timing-based servo pattern specified by magnetic force microscope observation is a shape in which a difference ($L_{99.9}-L_{0.1}$) of a value $L_{99.9}$ of a cumulative distribution function of 99.9% of a position shift width from an ideal shape in a longitudinal direction of the magnetic tape and a value.

9. The magnetic tape device according to claim 8,
wherein the timing-based servo pattern is a linear servo pattern which continuously or discontinuously extends from one side to the other side in a width direction of the magnetic tape.

10. The magnetic tape device according to claim 9,
wherein the timing-based servo pattern is a linear servo pattern which continuously extends from one side to the other side in the width direction of the magnetic tape and which is tilted with respect to the width direction by an angle of α, and
the ideal shape is a linear shape extending in a direction of the angle α.

11. The magnetic tape device according to claim 8,
wherein the vertical direction squareness ratio of the magnetic tape is 0.65 to 0.90.

12. The magnetic tape device according to claim 8,
wherein the difference ($L_{99.9}-L_{0.1}$) is equal to or smaller than 150 nm.

13. The magnetic tape device according to claim 8,
wherein the activation volume of the ferromagnetic hexagonal ferrite powder is 800 nm$^3$ to 1,600 nm$^3$.

14. The magnetic tape device according to claim 8,
wherein the magnetic tape further comprises a non-magnetic layer including non-magnetic powder and a binding agent between the non-magnetic support and the magnetic layer.

* * * * *